(12) United States Patent
Charlot et al.

(10) Patent No.: US 6,904,432 B2
(45) Date of Patent: Jun. 7, 2005

(54) ADAPTIVE DATA MANAGER

(75) Inventors: Regis Charlot, Lake Bluff, IL (US);
David Haines, Norridge, IL (US);
David Pilkington, Gurnee, IL (US);
Jose Maldonado, Jr., Chicago, IL (US)

(73) Assignee: Intelligent Medical Objects, Inc., Northbrook, IL (US)

(*) Notice: Subject to any disclaimer, the term of this patent is extended or adjusted under 35 U.S.C. 154(b) by 672 days.

(21) Appl. No.: 09/997,723

(22) Filed: Nov. 30, 2001

(65) Prior Publication Data

US 2003/0200213 A1 Oct. 23, 2003

(51) Int. Cl.$^7$ ............................................... G06F 17/30

(52) U.S. Cl. ............................. 707/9; 707/10; 707/101; 709/217; 709/219

(58) Field of Search ............................. 707/2, 3, 4, 9, 707/10, 101, 102; 709/217, 219, 225, 230; 705/8, 9, 30; 715/501.1, 513

(56) References Cited

U.S. PATENT DOCUMENTS

| | | | |
|---|---|---|---|
| 5,819,257 A | | 10/1998 | Monge et al. |
| 6,006,233 A | | 12/1999 | Schultz |
| 6,029,162 A | | 2/2000 | Schultz |
| 6,105,035 A | | 8/2000 | Monge et al. |
| 6,115,715 A | * | 9/2000 | Traversat et al. ............ 707/100 |
| 6,122,636 A | * | 9/2000 | Malloy et al. ............... 707/102 |
| 6,192,371 B1 | | 2/2001 | Schultz |
| 6,643,652 B2 | * | 11/2003 | Helgeson et al. ............. 707/10 |
| 6,708,186 B1 | * | 3/2004 | Claborn et al. ............. 707/102 |
| 6,721,747 B2 | * | 4/2004 | Lipkin ......................... 707/10 |

OTHER PUBLICATIONS

Tobbicke, Rainer, Distributed File Syatems: Focus on Andrew File System/Distributed File Service (AFS/DFS), Proceedings of the Thirteenth IEEE Symposium on Mass Storage System, Jun. 12–16, 1994, pp. 23–26.*

Schultz, ADEPT–THe Advanced Database Environment for Planning and Tracking, Jul.–Sep. 1998, Bell Labs Technical Journal, Lucent Technologies p. 1 and 4. (7 pgs).

Meyers, The Follow–up Note, AMIA Conference, Los Angeles, CA, Nov. 6, 2000, Intelligent Medical Objects.

Kepic, Abstractor+, Version 1.1.1 Production Release, Intelligent Medical Objects, Inc., Oct. 1999 QuadrMed Production Release CD, Northbrook, IL (1 pg) (associated documents below).

Pilkington, Abstractor+ Database Design, V.1.2, Internal use only document delivered with QuadraMed Production Release, under nondisclosure agreement, pursuant to sale of Abstract+ Version 1.1.1 release, pp. 4–6, 15–20, Nov. 1999 (52 pgs).

Health Information Data Abstractor/Collector Form Runner & Application Builder Developer's Manual, deliverd with QuadraMed Production Rel. pursuant to sale of Abstractor+ Version 1.1.1, pp. 6–9, 14. (103 pgs) Jul. 1999.

* cited by examiner

Primary Examiner—Shahid Alam
(74) Attorney, Agent, or Firm—Beem Patent Law Firm

(57) ABSTRACT

A method for managing a back-end information storage infrastructure and a flexible development environment for data storage using a computer system. The method includes managing system resources including a relational database. Meta data models are created to model processes and to define meta data elements and their relationships by using trees and graphs. The method manages access to the data by authenticating users through a directory describing user rights, while providing management of multi-user access and concurrency. The method includes running the processes that generate instance data, storing the instance data following the meta data model, and transforming the instance data into physical views.

8 Claims, 18 Drawing Sheets

ADAPTIVE DATA MANAGER

BACKGROUND OF THE INVENTION

1. Field of the Invention

The present invention is an advanced data management method and system, including both an information storage infrastructure and a database development environment, generally relating to relational databases, object oriented databases, and document management systems.

2. Description of the Related Art

The inventive advanced data management method and system are capable of use with relational databases, web site and client server applications, document and knowledge management applications, discrete data storage, and object-oriented databases.

The invention is particularly useful when used with relational databases (RDBMS), such as Oracle8i, for data management and development.

The past three years have seen the emergence of extensible markup language (XML). Extensible markup language describes a class of data objects called XML documents and partially describes the behavior of computer programs which process them. XML is an application profile or restricted form of standard generalized markup language (SGML) (ISO 8879). By construction, XML documents are conforming SGML documents. In other words, XML enables any storage of information into a text file format for example, as a document. XML databases allow discrete storage of such documents.

Lucent Technologies is believed to have patented a database management system using transitive closure solutions using standard SQL, primarily targeted to solve project management issues, i.e., pert charts or directed graph temporal dependencies.

Until now, efforts to create data management systems and software for databases have involved extremely lengthy and costly development cycles for database design, implementation, tuning and maintenance. These problems have been all too typical in the design and specification of schemas for projects.

Similarly, data warehousing projects have involved complex, time-consuming and expensive phases including data cleansing, building a snowflake model or other models, and harvesting reports. The first phase, data cleansing, typically has represented over 80% of the total time required for such data warehousing projects.

What is needed is a data management method and system that will avoid or eliminate the problems of existing systems.

BRIEF SUMMARY OF THE INVENTION

It is an object of the invention to provide a method and system for developing software and managing data, such as for managing patient medical records and other data, while avoiding or minimizing lengthy and costly development cycles for database design, implementation, tuning and maintenance, data cleansing, building of snowflake or other models, and difficulties in harvesting data and generating reports and user screens.

In accordance with the inventive adaptive data management (ADM) method and system, a static database model is provided and is optimized for manipulation of large volumes of data with a standard front-end component interface, thereby simplifying database design and data access, while reducing development cost and development time. Furthermore, the model does not require numerous qualified technical personnel to monitor all database activity, the data to be collected is described, both in format and in relationships, as meta data to the model, and user data (instance data) is then collected and stored using the format defined by the meta data. In tests, the inventive method and system have shown success in managing large numbers of records and in document indexing as useful in such applications as web sites. Due to the nature of ADM data storage, the data requires little of no cleansing before inclusion into a data warehousing database.

ADM provides access protection and tracking, ensuring data security and integrity, through a gateway requiring identity authentication and multi-layered access control. ADM manages multiuser access and concurrency.

The ADM may be used with an Oracle database running on any of several platforms to provide the data storage support, with as many as about 14 or more objects participating to the design. A set of components, developed as Microsoft COM objects, provide access to user front-end applications.

ADM provides both a back-end information storage infrastructure and a flexible development environment for data storage. ADM is based on a meta data model. The organization of the data itself (the meta data) is described to ADM prior to any collection of data. The meta data model encloses definitions of meta data elements as well as the relationships among these meta data elements. Data elements may be organized as trees, i.e., a meta data element has at most one parent data element, or as graphs, i.e., a meta data element may have one or more parent data elements, thus allowing representations of most possible data models.

ADM provides support for multiple development environments, using a simple component interface for complex back-end data storage, thereby simplifying access to instance data. Instance data consists of stored user data patterned after the meta data definition. The development environment includes a COM object, accessed from all applications referencing ADM, and an administration tool for model management. ADM allows transfer of data to and from ADM using XML. The XML document type definition is defined by the meta data definition.

ADM has been developed for access from conventional development environments (Microsoft Visual C++ and Visual Basic, Borland Delphi) as well as web environment tools such as Microsoft Active Server Pages (ASP). This tool is well suited for short transactions characteristic of web environments.

ADM provides additional simplified data access to any user, from the relational database manager standpoint, by allowing view definitions. A view consists of many meta data elements, which may be tightly or loosely connected. As instance data is created, any user can access the instance data represented as views, from any database environment tools, such as Microsoft Access or Microsoft MS Query.

ADM is complemented by Visual ADM. ADM and Visual ADM fit to the object-oriented document-view paradigm, such as: ADM provides the data back end (document layer), while Visual ADM provides user interface(s) to the user (view layer). Visual ADM is a thin-client form based application: forms are defined as scripts, stored into the ADM database, and retrieved at the Visual ADM client location when requested. Visual ADM also provides a robust scripting language, allowing forms to implement any type of business rules.

ADM and Visual ADM can be provided in the form of an InstallShield application, including an ADM COM object, ADM Administration Tool, two Visual ADM executables, several PDF documents ('ADM User Manual', 'ADM Administration Tool User manual', 'Visual ADM User Manual', 'Visual ADM Reference Manual'), as well as a sample implementation. In one embodiment of the invention, a running instance of Oracle8i is required prior to installation.

The inventive adaptive data management (ADM) method and system provide novel and useful features such as the ability to use both graph and tree structures in an optimized data model stored in a relational database. Also, ADM permits presentation of stored data as conventional tables (data view) for standard reporting. As the data changes and expands, the content of the data views reflects the changes. Any of these data views can be defined by end users and created automatically by ADM back end service. ADM provides a component for simple front-end interface development using Microsoft COM objects while providing access to each aspect of the inventive method and system. Moreover, ADM provides a transactional data access model suitable for web-based and client-server implementation.

DETAILED DESCRIPTION OF THE INVENTION

ADM is a data management solution. It is both a back-end information storage infrastructure and a flexible development environment for data storage. ADM is based on a meta data manager concept, namely, the organization of the data itself (the meta data) is described to ADM (prior to any collection of data). The meta data Manager encloses definitions of meta data elements as well as the relationships among these meta data elements. Data elements may be organized as trees (i.e. a meta data element has at most one parent data element) or as graphs (i.e. a meta data element may have one or more parent data elements), thus allowing representations of most possible data models.

Figure 1:
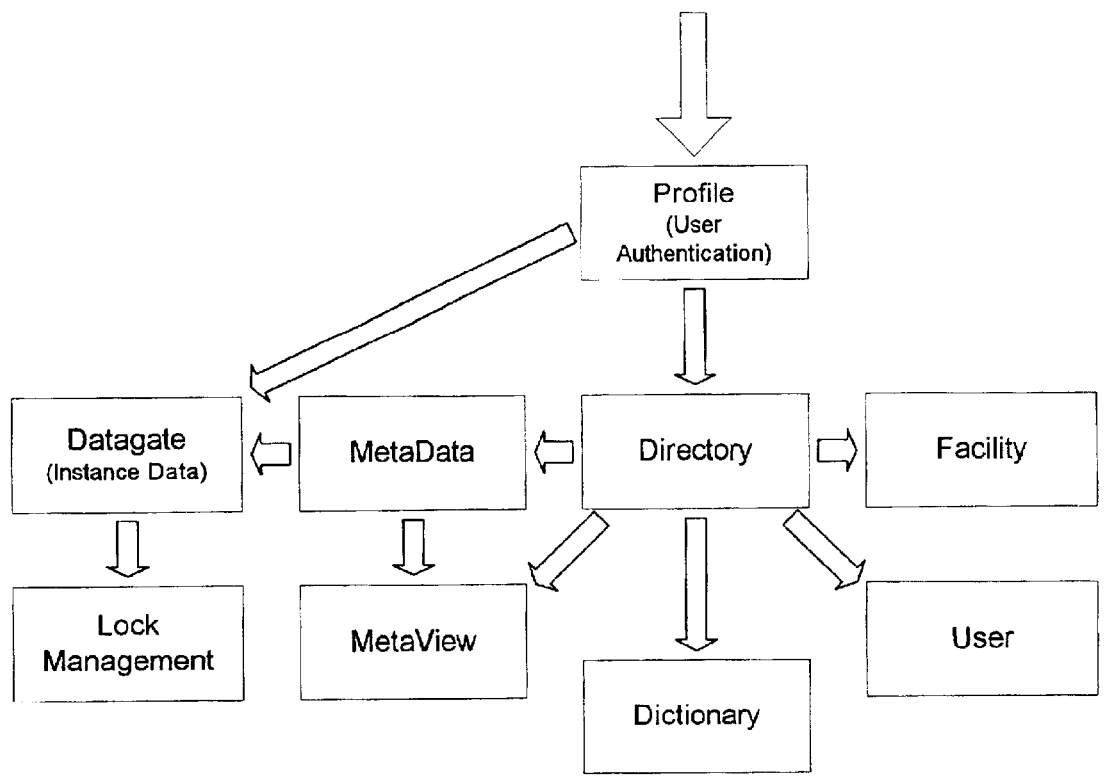
FIG. 1 is a schematic of the inventive adaptive database management component interfaces.

Turning to FIG. 1, the inventive adaptive data manager component interfaces are shown. In accordance with the invention as illustrated in FIG. 1 and the other figures, a method is provided for managing data using a computer system, comprising managing system resources, authenticating and selectively providing access to users through a directory describing predetermined user rights, modeling and organizing processes as meta data, running the processes and generating instance data, storing instance data following the meta data model while providing management of multi-user access and concurrency, and transforming the instance data into a report. The meta data may be organized in both trees and graphs. The inventive method is particularly useful for managing data relating to complex processes characteristic of humans and other living organisms.

ADM is a development environment. ADM provides a simple component interface to the complex back-end data storage. This interface simplifies access to instance data. Instance data consists of the stored user data, patterned after the meta data definition. The development environment includes a COM object, accessed from all applications referencing ADM, and an administration tool for model management. ADM allows transfer of data to and from ADM using XML. The XML document type definition is defined by the Meta Data definition.

ADM has been developed for access from conventional development environments (Microsoft Visual C++ and Visual Basic, Borland Delphi) as well as web environment tools such as Microsoft Active Server Pages (ASP). This tool is well suited for short transactions characteristic of web environments.

Figure 2:
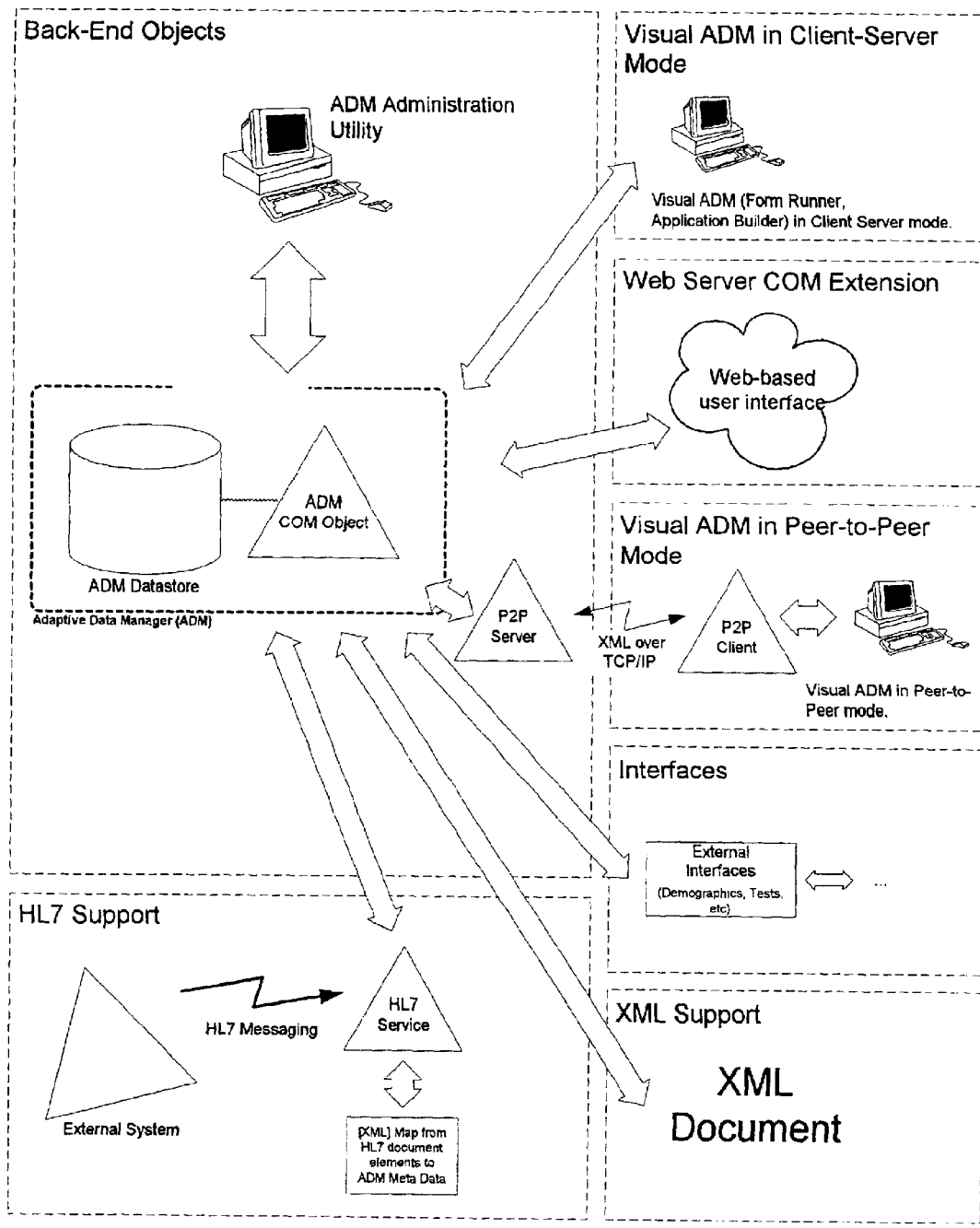
FIG. 2 is a system-wide description of the adaptive data manager.
Figure 3:
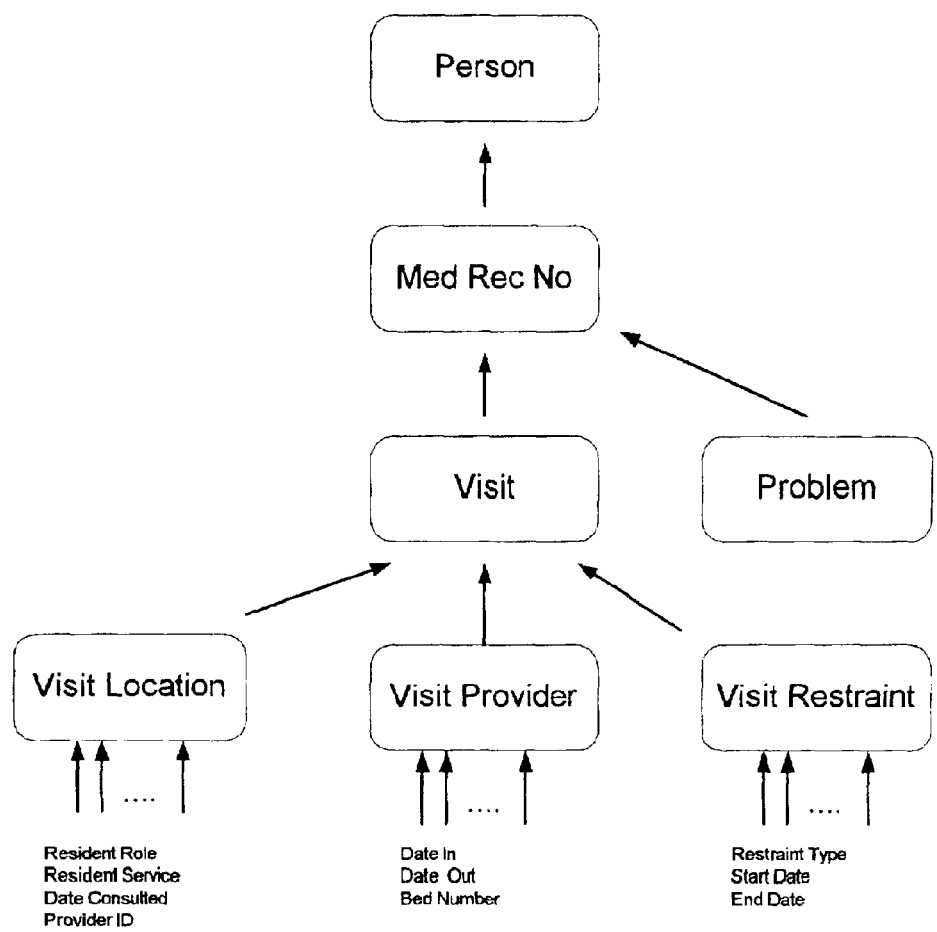
FIG. 3 is an example of meta data.
Figure 4:
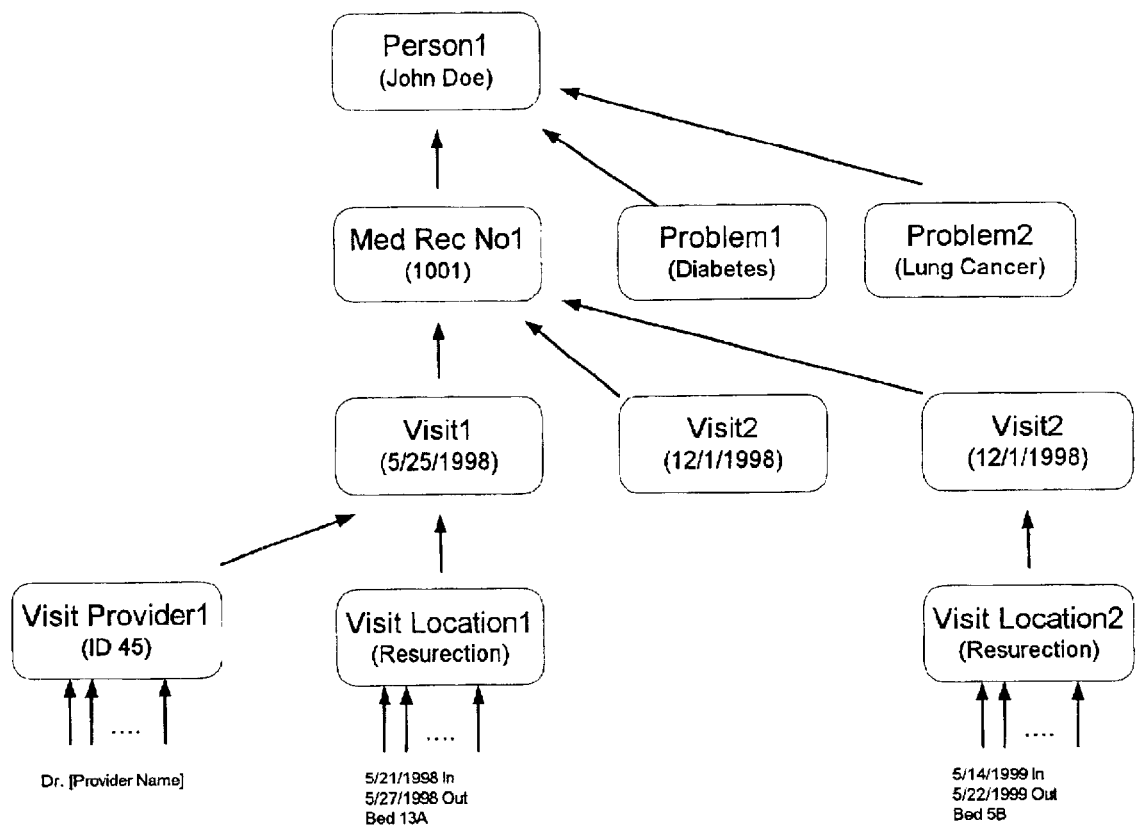
FIG. 4 is an example of instance data.

Turning to FIG. 2, ADM is shown in an implementation context, showing the relationship between the back-end objects including the adaptive data manager and the administration utility vis-à-vis visual ADM in client-server mode or peer to peer mode, web based user interfaces, external interfaces, such as HL7, and XML support for inport and export operations.

Figure 5:
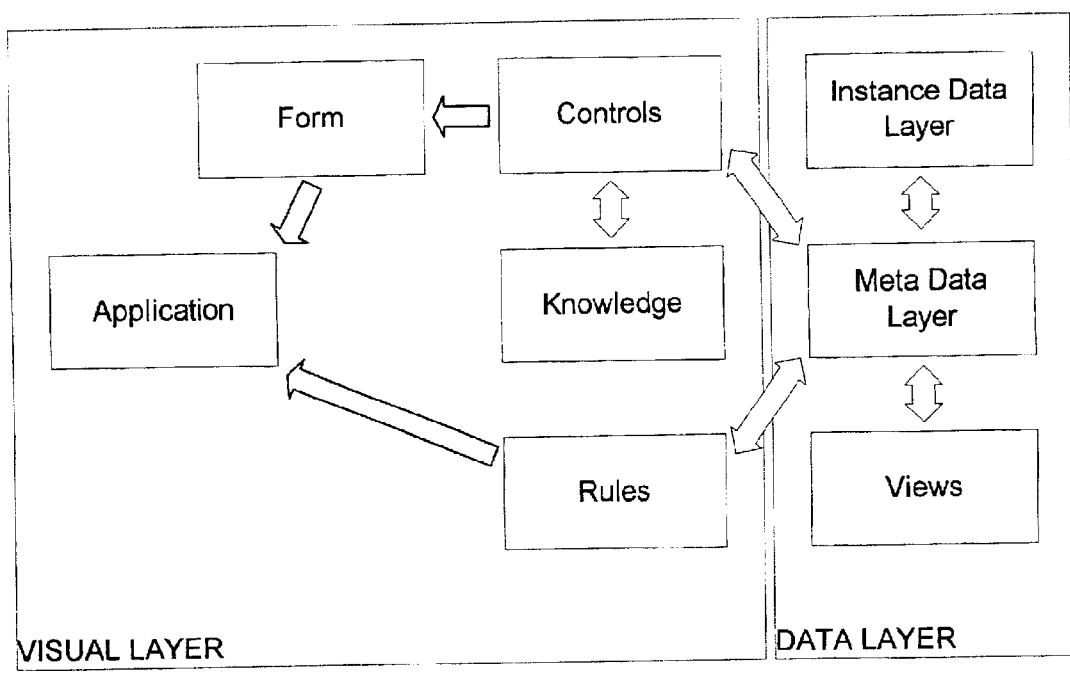
FIG. 5 is a schematic of interactions between ADM and Visual ADM.

Turning to FIG. 5, the interactions between ADM and Visual ADM are shown.

ADM provides additional 'simplified data access' to any user from the relational database manager standpoint, by allowing view definitions. A view consists of many meta data elements, tightly or loosely connected. As instance data is created, any user can access the instance data represented as views, from any database environment tools, such as Microsoft Access or Microsoft MS Query.

ADM is provided as an InstallShield. It consists of the ADM COM object, an Administration Tool, an 'ADM User Manual' PDF document, an 'ADM Administration Tool User manual' PDF document, as well as a sample implementation. A running instance of Oracle8i is required prior to installation.

Figure 6:
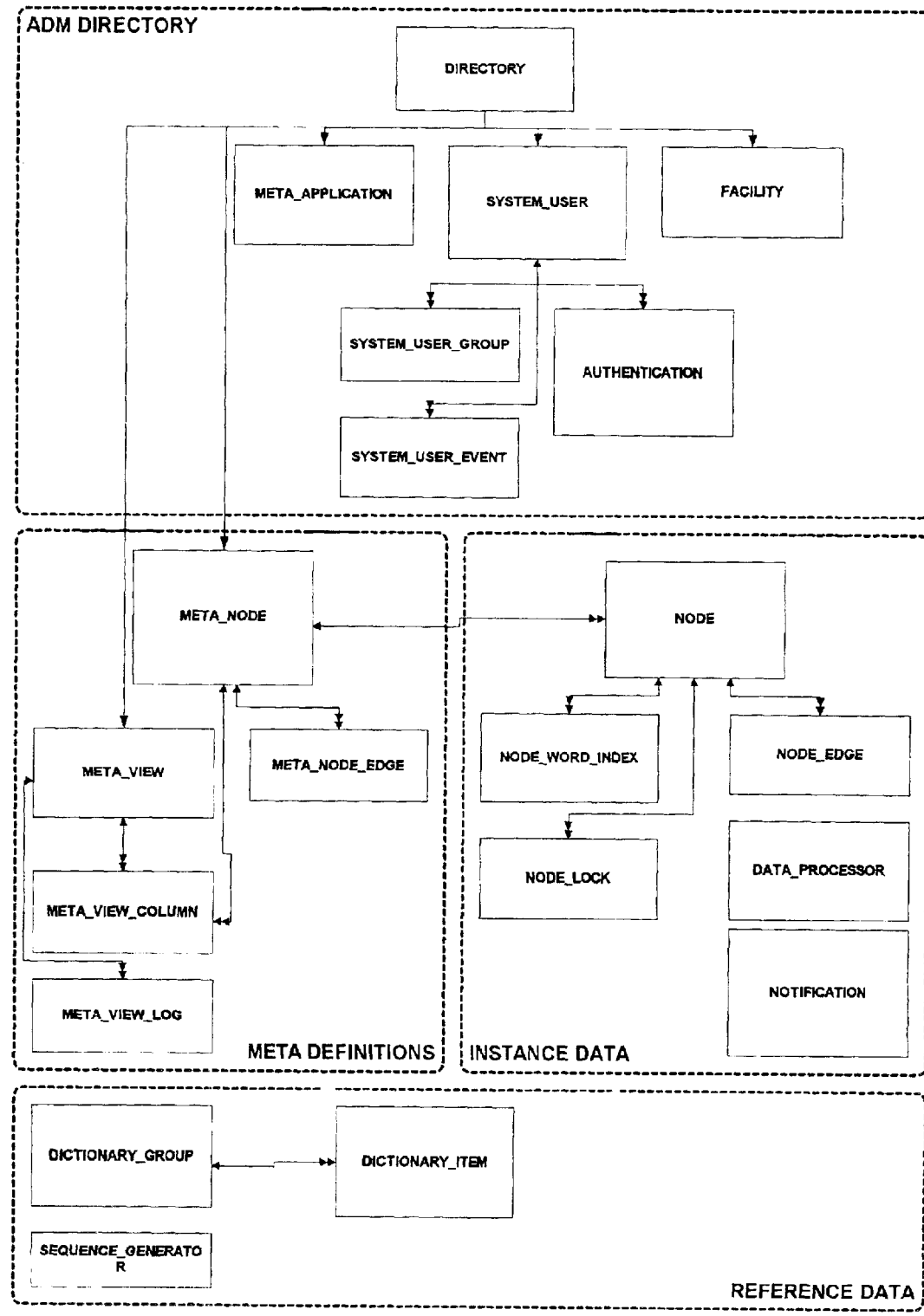
FIG. 6 is an overview of the entity relationship diagram for the ADM database.
Figure 7:
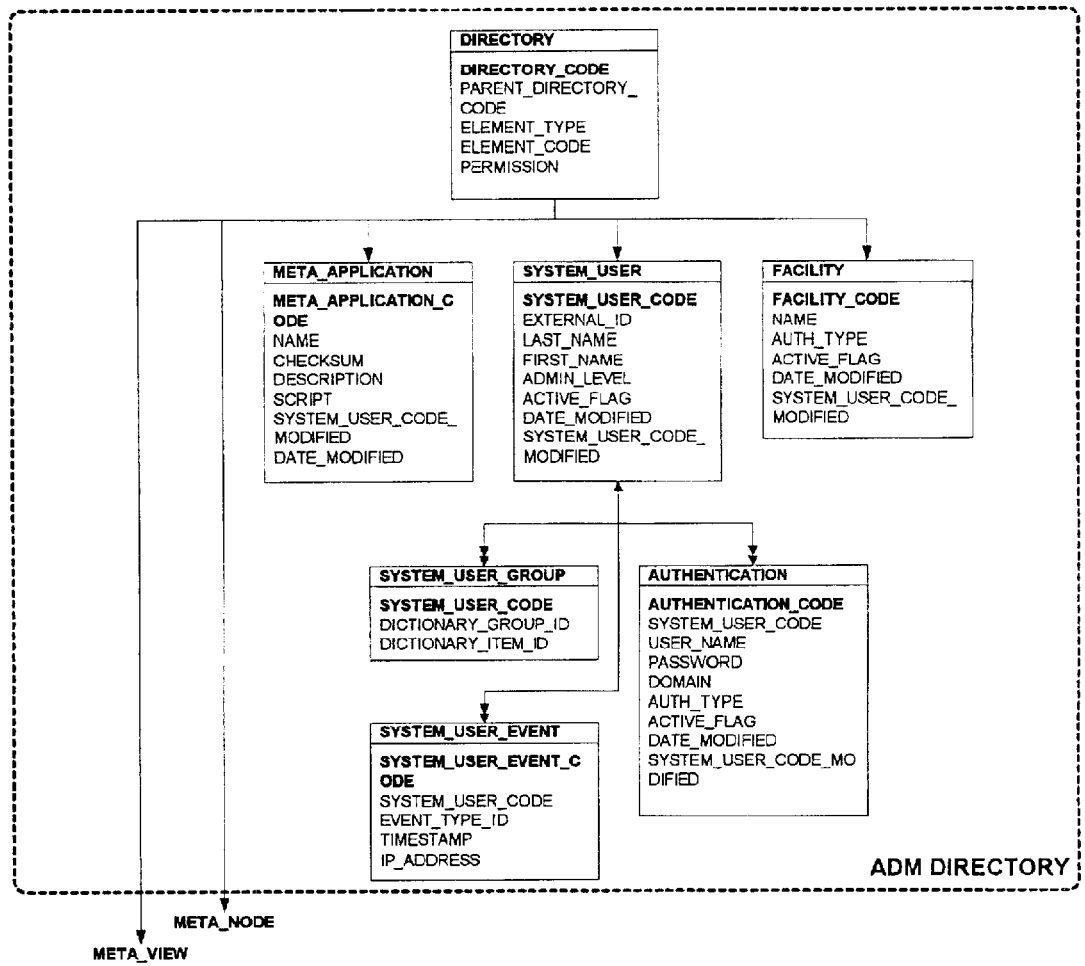
FIG. 7 is a detailed view of the ADM Directory portion of FIG. 6.
Figure 8:
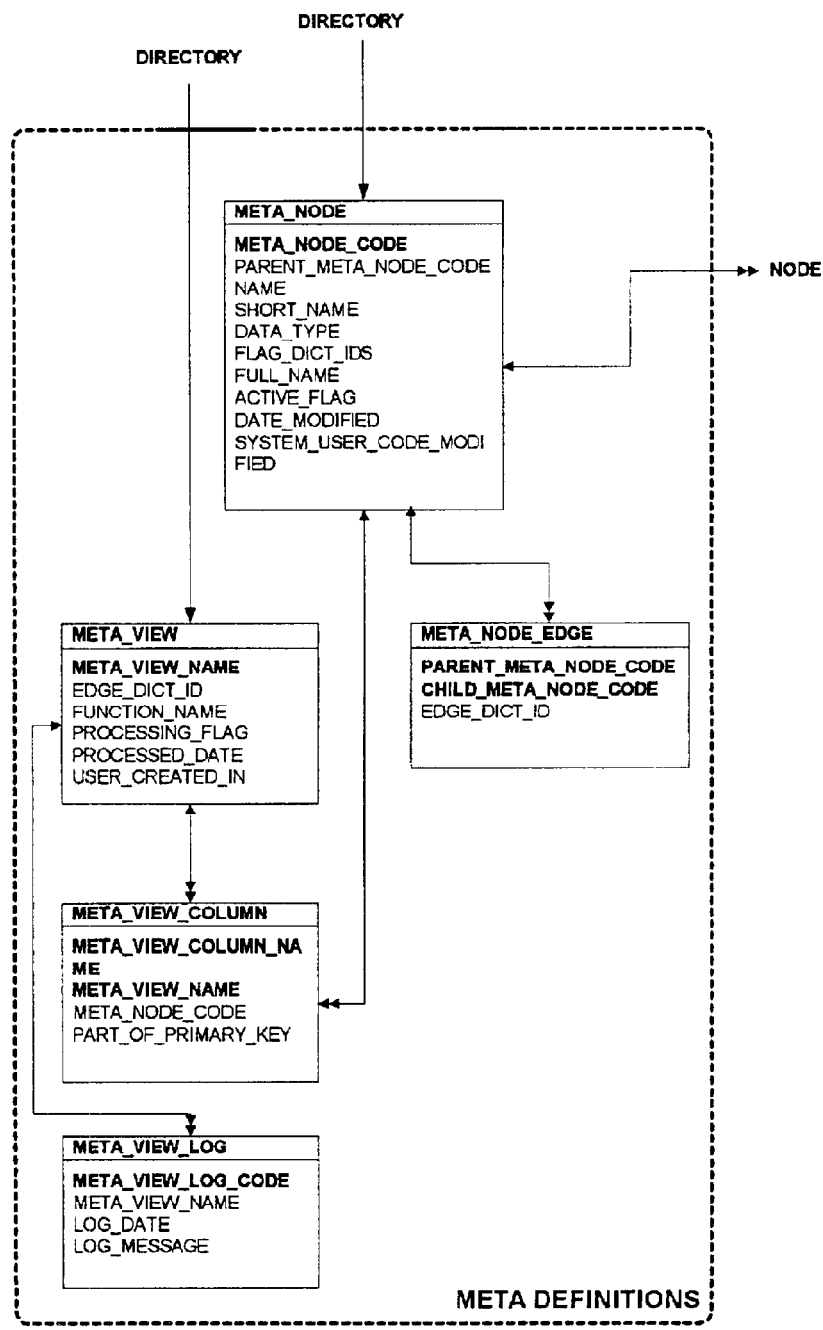
FIG. 8 is a detailed view of the Meta Definitions portion of FIG. 6.
Figure 9:
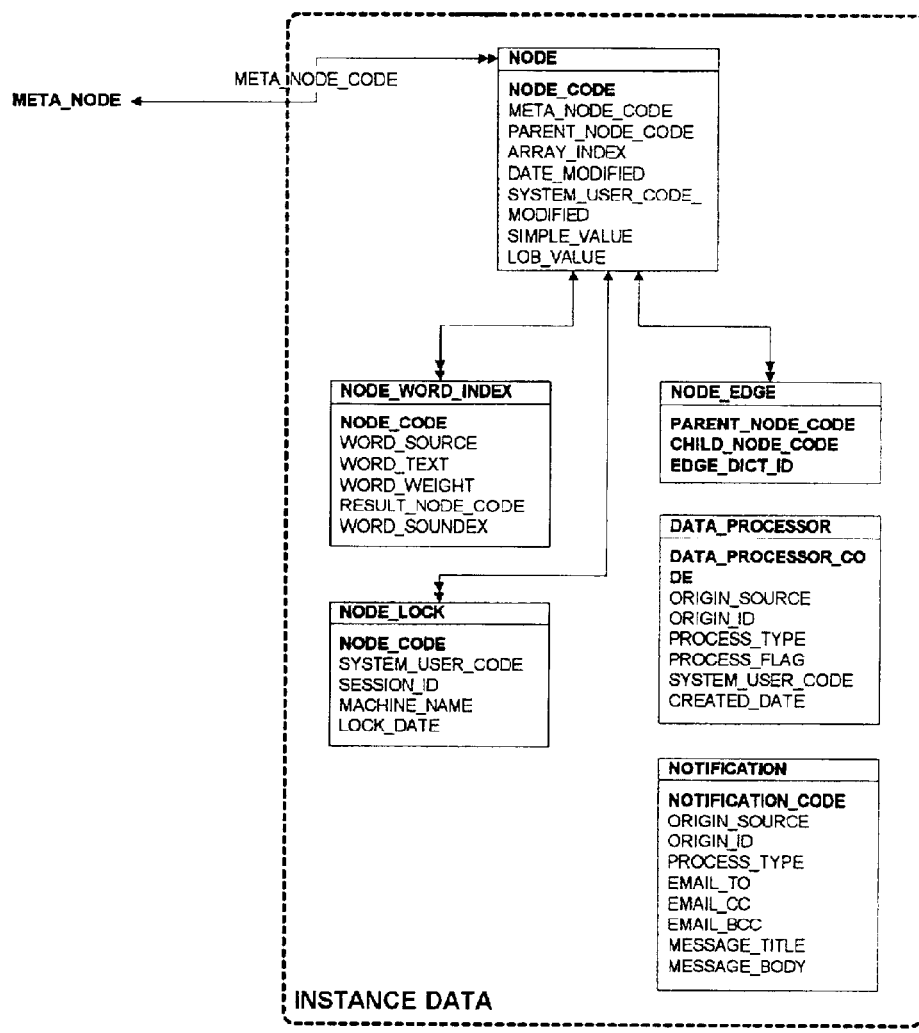
FIG. 9 is a detailed view of the Instance Data Definition portion of FIG. 6.
Figure 10:
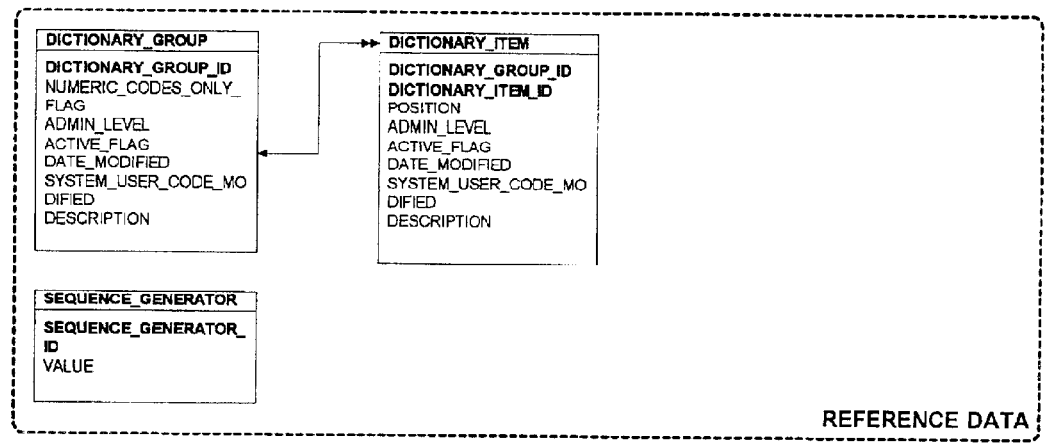
FIG. 10 is a detailed view of the Reference Data portion of FIG. 6.

Turning to FIG. 6, a schematic overview of the database design for ADM and Visual ADM is shown. FIGS. 7–10 provide the detailed views of each of the components of FIG. 6.

COM Technical Description

The ADM COM Object achieves mainly three distinct functions: data access and indexing, data transformation, and administration. These functions are available through several separate interfaces:

ADM.PROFILE

ADM.Profile is the gateway interface to ADM. An instance of the ADM.Profile interface must be created prior to any other ADM interfaces. In order to filly set the ADM.Profile interface, both successful login transaction to the Oracle database and user identification (either using trusted authentication or explicit authentication) are required. The profile interface is then communicated to any other interface for safely communicating user and database information.

ADM.DATAGATE

ADM.Datagate is the interface allowing data access. It provides multiple paths to access, add, modify, and delete any stored data (i.e. instance data). ADM.Datagate is also the interface for processing search requests.

ADM.LOCK

Data elements accessed via the ADM.Datagate interface are read-only unless the user requests exclusive access to portions of the data: during this process, locks will be placed on data elements, guaranteeing exclusive read/write access to the data. The ADM.Lock interface is a purely administrative interface. This interface allows the ADM Administrative Utility to monitor and delete locks.

ADM.DICTIONARY

Relational database model always includes dictionaries or reference tables for standard values. For example, if a study includes a field for 'Gender', the values for gender may be coded as 1 being 'Female' and 2 being 'Male'. Only '1' or '2' will be stored into the instance data, thus possibly allowing the description to be changed later without affecting the instance data.

ADM.Dictionary supports this model by providing methods to query codes and descriptions, retrieve a description given a code, etc.

ADM.INDEX

ADM.Index is the interface supporting document indexing under the Adaptive Data Manager paradigm. Indexing is declared at the Meta data level in the form of indexing flags, and any instance data creation will result in indexing requests. The ADM.Index interface is the open interface allowing for any external application to process requests resulting in keyword or concept indexing. This interface will be used, typically, by processes (or services) or applications monitoring newly created data and processing the request for indexing.

ADM.METADATA

The Meta data is the structure formally defining how data is collected. This interface is purely administrative: only the ADM Administrative Utility will make use of this interface. Note that inexperienced use of this interface may be detrimental to existing data elements.

ADM.METAVIEW

The Meta view structure is the data transformation aspect of ADM: instance data (created after the meta data defined pattern) is stored as graph into the database. Such organization does not easily enable users to report on any data elements. The Meta view structure allows users to define views as collections of meta data elements: when processed, these views are physical oracle tables, accessible by any user (with proper connection rights) with any SQL enabled tools. The ADM.Meta View interface is purely administrative: only the ADM Administrative Utility will make use of this interface. This interface also works in conjunction with several server-side services.

ADM.Script

The ADM.Script interface is the support interface for the Visual ADM suite of tools: Visual ADM's APPLICATION BUILDER is the application managing data using ADM-.Script; Visual ADM's FORM RUNNER is the application using this interface for end user processing. Note that this interface is only accessed from Visual ADM tools.

ADM.USER, ADM.FACILITY, ADM.DIRECTORY

These interfaces allow management of information related to user, security and user access rights.

These interfaces are purely administrative: only the ADM Administrative Utility will make use of these. Any information for a currently logged in ADM interface used is available through the required ADM.Profile interface.

ADM.PROFILE

The Adaptive Data Manager (ADM) is a data storage solution, and as such, must enforce and guarantee safety of stored data. ADM achieves this goal with complementary approaches:

By controlling user logins and users data access rights.

By keeping an audit trail of all user transactions (creations, updates and deletions) at the field level. Any user-modified data element is archived and tagged with the user information and date.

The ADM.Profile interface is the interface enforcing security with ADM. In order to access any of the interface services provided by ADM, one must successfully provide accurate information to log to the Oracle-based ADM data store, and also authenticate self as a registered ADM user.

Information required to log on to the Oracle data store consists of connection string, data stroe user name and password, and authentication user name and password information.

User authentication information is either using trusted authentication or explicit authentication.

Trusted authentication: the user has already satisfied corporate security when accessing network resources, and therefore the ADM Profile interface can assume that the user is trustworthy. Network trusted authentication information is gathered by the ADM Profile interface and is checked for authentication. In other words, no input is required from the user.

Explicit authentication: A user name and password is required from the user.

ADM.PROFILE TOOLS AND FUNCTIONS

CONNECTION PROCEDURE

IProfile is the interface granting access to any of the other ADM interfaces. Therefore, in order to access any of the ADM interfaces, one must first successfully create and connect an IProfile interface. For example, using Delphi,

```
var
    pProfile, pInterface: OLEVariant;
begin
    try
        pProfile := CreateOLEObjects('ADM.Profile');
        if pProfile.Open['Provider=OraOLEDB.Oracle.1;Persist Security
                Info=False;User ID=test;Data Source=tiger',
                'test', 'scott', 'host']
                and pProfile.Authenticate[1, '', ''] then
        try
            pInterface:= CreateOLEObject('ADM.xx');
            pInterface.SetProfile(pProfile)
            [..]
            pInterface:= unassigned;
```

-continued

```
        except
            [..]
        end;
        pProfile := unassigned;
    except
        [..]
    end;
end;
```

In other words, a profile is created, and a connection is established to the Oracle ADM data store; user authentication is immediately established using the Authenticate( ) function. Note that user authentication may be either explicit or trusted. Once the profile object has been successfully initialized, this object can be communicated to other ADM interfaces as a short hand for communicating database and user profiling. Note that a profile interface must be fully defined (both connected to a data store and user authenticated) in order to be communicated to another interface (using the SetProfile( ) function).

REVIEWING AND VERIFYING ACCESS RIGHTS

The IProfile interface describes security attributes to all other ADM interfaces using the HasPermission( ) function. The HasPermission( ) function returns a permission value for some object within a class of object interface. The iDirectoryType value defines the interface; possible interfaces are Facility, User Group, User, Meta Data, Meta View and Script interfaces. The Permission Type value is defined by interface: this value must be supplied in the context of the interface, and must be legal by interface. Using the ViewProfile( ) function is very similar to the HasPermission( ), only differing to that this function returns all rights for a specific interface instance element.

DATABASE CONNECTION AND TRANSACTIONS

The Profile interface performs database transactions for all other ADM interfaces using the Execute( ) function. A SQL statement is passed as a parameter to the Execute( ) function, and if the transaction is successful, Execute( ) returns a record set from which individual field values are retrieved.

Function Reference, including the function name, description and syntax:

Open: Establishes a connection to an Oracle database. This connection must point to an IMO's Adaptive database model. Returns TRUE if connection is established, FALSE otherwise. If connection was not established, check content of LastError to get a description of the connection failure. Note: strConnection string specified OLE DB provider and necessary parameter information for the provider. For correct data retrieval, Oracle Provider for OLE DB should be used. Syntax Function Open(const strConnection, strUserName, strpassword, strhost: String): boolean Authenticate: Authenticate the user, either using explicit or trusted authentication. Set the first parameter of Authenticate( ) to 0, and provide a user name and password to proceed to explicit authentication. Set the first parameter of Authenticate( ) to 1 to proceed to trusted authentication. In this case, note that no values are necessary for username and password parameters. Returns TRUE if user authentication succeeded. Syntax Function Authenticate(const iAuthentication: longint; sUsername, sPassword: String): boolean HasPermission: The HasPermission( ) function returns a permission value for some object within a class of object interface. The iDirectoryType value defines the interface; possible interfaces are Facility, User Group, User, Meta Data, Meta View and Script interfaces. The PermissionType permission value is defined by interface: this value must be supplied in the context of the interface, and must be legal by interface. Possible numeric values for iDirectoryType are:

| 0 | Undefined |
|---|---|
| 1 | Facility |
| 2 | User Group |
| 3 | User |
| 4 | Meta Data |
| 5 | Meta View |
| 6 | Script |

Possible numeric values for PermissionType, by interface are:

| Interface | Value | Description |
|---|---|---|
| Facility | 0 | Create |
| | 1 | Read |
| | 2 | Update |
| | 3 | Delete |
| User Group | 0 | Create |
| | 1 | Read |
| | 2 | Update |
| | 3 | Delete |
| User | 0 | Create |
| | 1 | Read |
| | 2 | Update |
| | 3 | Delete |
| Meta Data | 0 | Create |
| | 1 | Read |
| | 2 | Update |
| | 3 | Delete |
| Meta View | 0 | Create |
| | 1 | Read |
| | 2 | Update |
| | 3 | Delete |
| Script | 0 | Create |
| | 1 | Read |
| | 2 | Update |
| | 3 | Delete | sCode is the object database code corresponding to the interface identified by the iDirectoryType value. For example, if iDirectoryType is 'Meta Data', then sCode will be a Meta Node Code.

Syntax Function HasPermission(Idirectory: Directory, iDirectoryType: longint, sCode: String, PermissionType: longint): OLEVariant;

ViewProfile: The ViewProfile( ) function returns all permission values for some object within a class of object interface. The iDirectoryType value defines the interface; possible interfaces are Facility, User Group, User, Meta Data, Meta View and Script interfaces. The permission value is defined by interface: this result must be interpreted in the context of the interface.

Possible numeric values for iDirectoryType are:

| 0 | Undefined |
|---|---|
| 1 | Facility |
| 2 | User Group |
| 3 | User |
| 4 | Meta Data |
| 5 | Meta View |
| 6 | Script | sCode is the object database code corresponding to the interface identified by the iDirectoryType value. For example, if iDirectoryType is 'Meta Data', then sCode will be a Meta Node Code. Syntax function ViewProfile (Directory: Idirectory; iType longint, sCode: String): OLEVariant;

Properties: The Properties property returns properties related to the user identified as part of the Authentcate( ) method call. Possible values for Item are:

| | |
|---|---|
| NAME | Returns the user full name |
| LASTNAME | Returns the user last name |
| FIRSTNAME | Returns the user first name |
| CODE | Returns the user code |
| LEVEL | Returns the user administrative level |
| USERNAME | Returns the user username |
| ROLES | Returns the user roles |
| ACTIVE | Returns TRUE is the user is active |
| EXTERNALID | Returns an additional administrative ID for the user |

Syntax Property Properties[Item: String]: OLEVariant;

Connected: The Connected property indicates whether IProfile interface is connected to a database. Syntax Property Connected: boolean;

Connection: The Connection property returns an ADO Connection object. This object is defined in the Microsoft ActiveX Data Objects 2.0 Library (see msado20.tlb) and is responsible for all database transactions. Syntax Property Connection:_Connection;

Close: The Close function closes the connection to the database. Syntax Procedure Close;

Execute: The Execute function executes the specified query (SQL statement) and returns resulting RecordSet. Syntax Property Execute(strSQL: string):_RecordSet;

Sequence: The Sequence function returns the next unique number in the specified sequence. Syntax Property Sequence (strSeed: String): integer;

BeginTransaction: The BeginTransaction function begins a new database transaction.
Syntax Procedure BeginTransaction;

Commit: The Commit function saves any changes and ends the current transaction
Syntax Procedure Commit;

Rollback: The Rollback function cancels any changes made during the current transaction and ends the transaction. Syntax Procedure Rollback;
ADM.DATAGATE The ADM.Datagate COM object interface is a component interface that allows easy access to complex data stored on a relational database server, using the IMO Adaptive Database Manager. ADM.Datagate tremendously simplifies data modeling, design and access to very large amounts of data. The data model can be expanded or reduced at any time. Expanding the data will not affect current applications accessing ADM.Datagate interface services.

The data that is stored through ADM.Datagate is modeled after either trees or graphs. Any real life data can be stored using either of these formal data models into ADM.Datagate. The definition of the data to be captured is defined by the Meta data, and represents the data element hierarchy and associated attributes. The user data, accessed from or sent to the ADM.Datagate COM object, is stored into the database repository as instance data. The instance data is modeled after the Meta data.

DATA STORE MODEL

The database methodology used by the system is a free-form data model (meta data model) that stores all collected (or instance) data in the database as granular information: Many "records" are used to represent a traditional patient demographic record, or an encounter record. For example, the visit date would be granular information about an encounter (encounter class information type) and represents an attribute of the encounter. This model is adaptive to any particular situation; during implementation at a specific location, many more attributes for the "encounter class", for example, can be defined without having to modify the structural definition of the database.

These structural definitions, or meta data, are organized in the database back-end as a tree: all granular information is stored as nodes, with pointers or edges to define the parent relationships. All user data, or instance data, are themselves patterned after meta data: meta data is the framework for creating new instance data. Therefore, this design schema is data driven, allowing for rapid and dynamic customization of the system for any new data elements that present themselves.

Complementing this design schema is a number of additional tables that store data in a traditional relational format. Security tables allow very specialized access to the system and the data stored therein. A set of archive tables provides a thorough permanent data-auditing trail.

META DATA AND INSTANCE DATA TABLES

As stated earlier, all user data within the system can be represented as a tree. The tables that make up the Meta data section of the database represent how this tree is to be stored. An example is in FIG. ##.

META_NODE

The Meta_Node table will store all of the data definitions and their relationships for the Abstractor+ database. To continue the previous example, a possible iteration (or multiple instances) of the above meta data could be represented as in FIG. ##.

The meta model may have many meta roots; It is possible to define many concurrent meta model trees, and to also have corresponding separate instance data trees in the same database. The previous example meta model tree, instance data would be represented in the database by the following tables:

NODE

The node table encapsulates all of the current data values that were gathered in the system with the relationships between these data elements as defined by the meta data. All data stored in this node table is also marked with an owner. Modifying a row in this table will mark the new data with a new owner and save the previous data value into an archive table. The client software application provides users the ability to review all instance data versions. Deletion of any instance data in the database is strictly prohibited.

META VIEW

Functionality is provided to hide the granularity of the free-form flexible database model of ADM and to enable simple access to the data enclosed into ADM. Any user, with appropriate database rights, can query the ADM data store model database using conventional tools such as Microsoft Access or Microsoft Query.

A mechanism has been created to allow users to define Meta Views constituted of meta data elements. These Meta views are created and maintained by ADM. Any change to the instance data is automatically retrofit into the Meta view structure. Refer to the 'ADM Administration Utility User Manual' document for more information.

IDENTIFIERS

In order to simplify access to the data, any data transaction is effective using identifiers. An identifier is a string that represents any distinct data element.

Data access is possible using identifiers. An identifier specifies where to access data. For example, a hypothetical Meta data model:

Patient

| | |
|---|---|
| Last_Name | Child of Patient element |
| First_Name | Child of Patient element |
| Visits[] | Child of Patient element |
| Visit_Date | Child of Visits Array element |
| Etc.. | |

Each patient created into this model will be treated as a Patient element. Each Patient element will have a Last_Name, a First_Name and many patient Visits. Patient is the root for all patient related elements.

One instance of the Datagate object only refers to one instance data root at the same time, PATIENT begins the one in our example. Accessing the patient's last name can be done by specifying patient.last_name. The Visit element is an array of elements. Accessing the date of the first visit would be patient.visit[0].visit_date.

IDENTIFIER REFERENCE

An identifier is a reference to a specific meta data layer element. An identifier consists of one or many identifier terms separated by a period ('.'). Each identifier term in turn is a leaf element of the instance data tree or the root for a specific branch of the instance data tree. For example, patient.last_name.

Patient is the top root of the tree, and Last_Name is a child element inside the meta data tree of elements. patient.visit[c].admit_date Patient is the top root of the tree, Visit[ ] is an array element where the c index indicates the current branch, and Visit_Date is a leaf element.
patient.med_rec_no[c].visit[c].diagnosis[0]code Patient is the top root of the tree, Visit[ ] and Diagnosis[ ] are array elements when the c index indicates the current branch index, Diagnosis[0] is branch 0 of the Diagnosis array, and code is a leaf element.

Identifier abbreviations can be used, as Datagate will interpret these abbreviations at run time. Using the previous examples, the identifiers can be rewritten as:
 patient.last_name
 visit[c].admit_date or even admit_date
 diagnosis[0].code Identifier items can be of leaf type (thus string, integer, boolean, date, real, etc.) or array type. When referring to array identifier items, one must also specify the array argument. Array arguments are of several types:
 'c': The current record of the array. If the array is Visit[ ], then Visit[c] is the current visit. Note that the index of an array can be accessed and set using the indexOf( ) function. The c record index can be offset with an integer value. For example,
 visit[c].visit_date
 diagnosis[c+1].code
 'n': The last record of an array. If this array is empty then an empty value will be returned. The n record index can be offset with an integer value as well. For example,
 visit[n].admit_date
 an integer: All array records can be retrieved individually by an integer. If an array record is requested and that record has not yet been defined, then it will be created, as well as any intermediary records to make up that record index. For example,
 visit_dx[0].visit_dx_medcode

DATATYPES

Every meta data element has a data type, which specifies a storage format, constraints, and valid range of values. A variety of predefined data types are provided. A scalar type has no internal components. An array type has internal components that can be manipulated individually. The following figure shows the predefined data types.

| Type | Storage Family | Data type |
|---|---|---|
| Scalar | Number | Integer |
| | | Real |
| | Character | String |
| | | LongString |
| | Boolean | Boolean |
| | Date & Time | Date |
| | Binary large object | Blob |
| Array | Array | Array |
| | | Virtual Array |

NUMBER TYPES

Number types allow you to store numeric data (integers and floating-point numbers), represent quantities, and perform calculations.

INTEGER

The INTEGER data type is used to store signed integers. Its magnitude range is −2147483647 . . . 2147483647.

FLOAT

The FLOAT data type is used to store fixed or floating-point numbers of virtually any size. Its magnitude range $5.0 \times 10^{-324}$ . . . $1.7 \times 10^{308}$. The maximum precision of a FLOAT value is roughly equivalent to 15 decimal digits.

CHARACTER TYPES

Character types allow you to store alphanumeric data, represent words and text, and manipulate character strings.

STRING

The STRING data type is used to store character data. The maximum amount of data that can be stored into a STRING data type is 255 characters.

LONG STRING

The LONG STRING data type is used to store (nearly) unlimited-size character data. The maximum amount of data that can be stored into a LONG STRING data type is 4294967294 characters.

BOOLEAN TYPES

The following types allow you to store and manipulate logical (true, false) values and date/time.

BOOLEAN

The BOOLEAN data type is used to store the logical values TRUE and FALSE. Only logic operations are allowed on BOOLEAN variables.

DATE

The DATE data type is used to store fixed-length date/time values. DATE values also include the time of day. The integral part of a DATE value is the number of days that have passed since Dec. 30, 1899. The fractional part of a DATE value is the fraction of a 24-hour day that has elapsed.

BINARY OBJECTS

Binary objects can be stored using the BLOB (Binary Large Object) data type.

ARRAY TYPE

The Array data type is the data type allowing for building lists of values. Values can be a single scalar data type, multiple scalar data types thus making a record of scalar and array data types. This is the essential building block for complex business model data storage.

The virtual array data type is the data type allowing to build arrays of references of elements belonging to other arrays. For example:
 Patient.Visit[ ].Medication[ ]: Medication[ ] is a an array of medications for the patient for each visit.

Patient.All_Medications[ ]: All_Medications[ ] could be set as a virtual array of all patient medications, regardless of the visits. Virtual Arrays are especially designed for creating summary lists, as a collection of only some array elements of another array Meta data node.

TYPE TO META DATA CODING

Data types are coded and accessed as numbers inside the Meta model. The following table provides the mapping between formal data types and data type number values.

| Data type | Number |
|---|---|
| Undefined | 0 |
| String | 1 |
| Integer | 2 |
| Float | 3 |
| Date | 4 |
| Long String | 5 |
| Boolean | 6 |
| Array | 7 |
| Array Record | 8 |

Virtual Array

ADM.Datagate Tools and Functions

ADM.Datagate provides a set of functions for accessing and navigating inside atomic data as well as accessing data as a whole. Note that most functions will return data as variants, so that application data typing may be less of an issue.

ACCESSING DATAGATE

IDatagate is a COM object interface. IDatagate relies on a previously declared IProfile interface to establish a connection to the datastore. For example, using Delphi,

```
var
    pDoc, pProfile: OLEVariant;
begin
    try
        pProfile := CreateOLEObjects('ADM.Profile');
        if pProfile.Open['Provider=OraOLEDB.Oracle.1;Persist Security
            Info=False;User ID=test;Data Source=tiger',
            'test', 'scott', 'host'] and
            pProfile.Authenticate[1, '', ''] then
        try
            pDoc := CreateOLEObject('ADM.DATAGATE');
            pDoc.SetProfile(pProfile)
            [..]
            pDoc := unassigned;
        except
            [..]
        end;
        pProfile := unassigned;
    except
        [..]
    end;
end;
```

MANAGING INSTANCE DATA

Data elements are retrieved from the database by using the Open( ) function. Closing access to the data elements is set by using the Close( ) function. Saving data element changes is achieved by using the Save( ) function. For example using Delphi:

[..]
b :=pDoc.Open[iNodeCode];
[..]
pDoc.Close;
[..]

In this example, the Boolean variable b indicates if loading the pDoc Datagate object with the iNodeCode root code was successful. Note that iNodeCode indicates an instance data root nod code.

ACCESSING AND SETTING ELEMENT VALUES

VALUE, SETLOCK, CLOSELOCK, ISREADONLY

Data elements are accessed and set using identifiers through the value( ) function. For example, Using Delphi:

Var a: olevariant;
[..]
A :=pDoc.Value['patient.first_name'];
pDoc.Value['patient.first_name']:='Doe';
Using Active Server Pages:
Dim A
A=pDoc.Value("patient.first_name")
pDoc.Value("patient.first_name")='Doe'

A data element can only be set if it is in Read/Write mode. Use the SetLock( ) function to be able to write to data elements. The SetLock( ) function will return TRUE if the element was effectively locked. To check if a data element is Read Only, use the IsReadOnly( ) function.

INDEXOF, COUNT, CURRENTINDEX, ORDER

Access through the data element is made using identifiers. To set the current data array element, use the IndexOf( ) function. To know the size extent of an array identifier, use the Count( ) function. Note that the count function will return 1 for a non-array identifier. For example, Using Delphi:
pDoc.IdexOf['patient.visit[0].DX[ ]']:=1;
Using Active Server Pages:
pDoc.IndexOf("patient.visit[0].DX[ ]")=1

After setting the current array subscript using the IndexOf( ) function, it is possible to use a syntax referring to the current subscript. For example:

Using Delphi:
pDoc.IndexOf['patient.visit[0].DX[ ]']:=1
pDoc.Value['patient.visit[0].DX[c]']:='Heart Failure';
Using Active Server Pages:
pDoc.IndexOf("patient.visit[0].DX[ ]")=1
pDoc.Value("patient.visit[0].DX[c]")='Heart Failure'

DX[c] is actually making reference to DX[1]. It is possible to set all the current subscripts at once using the CurrentIndex function. For example, Using Delphi:
pDoc.CurrentIndex :='patient.visit[2].DX[5]';
Using Active Server Pages:
pDoc.CurrentIndex="patient.visit[2].DX[5]"

In other words, the current index for User.Visit[ ] is 2, and the current index for User.Visit[2].DX[ ] is 5.

It is possible to change the order of subscripts within an array, using the Order( ) function. For example, one could set that patient visit 2 should come after patient visit 5 by writing:

Using Delphi:
pDoc.Order['patient.visit[2]]:=5;
Using Active Server Pages:
pDoc.Order("patient.visit[2]")=5

DELETE

The Delete( ) function allows for element management, by allowing deletion of any element. Note that the parent of the element being deleted must be locked, i.e. into a read-write state. Refer to the SetLock( ) function for more information.

CREATING AND ADDING NEW ELEMENT VALUES
VALUE

A whole new tree can be made by creating a new instance of the ADM.DATAGATE object, establishing a connection, and starting to assign values to the new instance pointer using the Value[ ] property. For example, Using Delphi:

```
Var
    pDoc, pProfile: OLEVariant;
[..]
    pDoc := CreateOLEObject('ADM.DATAGATE');
    if pDoc.SetProfile(pProfile) then
        [..]
        pDoc.Value['user.last_name'] := 'Doe';
        [..]
        pDoc.Save;
[..]
```

Using Active Server Pages:

```
dim pDoc
dim pProfile
[..]
    pDoc = CreateOLEObject("ADM.DATAGATE")
    if pDoc.SetProfile(pProfile) then
        [..]
        pDoc.Value("user.last_name") = "Doe"
        [..]
        pDoc.Save
[..]
                    ADD
```

New elements are created using the Value[ ] property and the Add( ) function. A new array record is created using the Add( ) function. This presuppose that the array is in read/write mode, i.e. a call to SetLock( ) was previously made. For example, Using Delphi:
Var L: longint;
[..]
L:=pDoc.Add['user.visits[ ]'];
Using Active Server Pages:
Dim L
L=pDoc.Add("user.visits[ ]")

The returned value, L, is the subscript for the new array record. Note that the identifier must be an array, and thus, must have the '[ ]' notation.

SET OPERATIONS
XML

Data elements can be accessed or set, either in parts or in entirety, using the XML property.

SEARCHING THE ADAPTIVE META MANAGER
FIND, FINDKEYWORD, OPTIONS, NODEINFORMATION

ADM.Datagate instance data can be queried using the Find, FindKeyword, Children and NodeInformation functions. Find( ) or FindKeyword( ) are the functions initiating the query, FindFirst( ) returns the first result and FindNext( ) returns all subsequent results. FindFirst( ) may be called again to loop through the result set without calling Find( ) or FindKeyword( ) again. Refer to following respective sections for Children, NodeInformation, FindFirst and FindNext functions.

FIND

The Find( ) function allows for simple element queries, such as 'user last name is Doe and user first name is John'. This function allows for any combination of Boolean operators and parentheses to support such queries. The syntax for the Find( ) search argument is as follows:

statement ->bexpr
    bexpr ->bterm {'or' bterm}
    bterm ->bfactor {'and' bfactor}
    bfactor ->'('bexpr')'|MetaID relop factor|MetaID|'START' 'WITH' number
    relop ->'<'|'<='|'<>'|'>'|'>='|'='|'like'
    factor ->number|String|MetaID In other words, one can search for all instance data trees that have a Last_Name defined:
    Find['LAST_NAME']
. . or find all records where the last name is "Doe":
    Find['LAST_NAME="DOE"']
. . or find all records with a last name where the first name is "John":
    Find['LAST_NAME and FIRST_NAME="JOHN"']
A more complete example could be as such:
Using Delphi:

```
..// pDoc is an olevariant, has been previously created, and has been
assigned a profile object.
[..]
if pDoc.Find['LAST_NAME = "DOE" AND FIRST_NAME=
"JOHN"'] > 0 then
begin
    if pDoc.FindFirst[i] then
    repeat
        // the value of 'i' is the top root node satisfying the query
    until not pDoc.FindNext[i];
end;
```

Using Active Server Pages:

```
..// pDoc is an olevariant, has been previously created, and has been
assigned a profile object.
..[..]
    if (pDoc.Find("LAST_NAME = ""DOE"" AND FIRST_NAME=
    ""JOHN"" ") > 0)
    and_
        (pDoc.FindFirst(i)) then
        do
            // the value of 'i' is the top root node satisfying the query
            [..]
        loop until not pDoc.FindNext(i)
    end if
```

These examples show a query initiated using the Find( ) method. The Find( ) function returns the number of elements matching the criteria set. The first element is retrieved using the FindFirst( ) method. Note that FindFirst( ) returns a Boolean value to indicate if the call to FindFirst( ) was successful. After making use of this value, FindNext( ) is called to retrieve the next element. Note again that FindNext( ) returns a Boolean value to indicate if the call to FindNext( ) was successful. FindNext( ) will return FALSE when the last entry has been retrieved using FindNext( ).

'START WITH' EXPRESSION

It is sometimes necessary to perform queries within a range of elements, such as the current data gate element, for example. Such element usually identifies the top of the tree (or sub-graph) where search results are meaningful. This can be achieved using the 'START WITH' expression, and specifying a node code being the top of the local sub-tree or sub-graph.

FINDKEYWORD

The FindKeyword( ) function allows for keyword or concept searches for a specified portion of the data store or for the whole data store. For example, if the Adaptive Data Manager data store has data elements about users and media articles, then one could look for all articles making references to 'Chest' and 'Pain', within the 'Media[ ]' branch. Note that the search is case insensitive. FindFirst( ) returns the first result and FindNext( ) returns all subsequent results. FindFirst( ) may be called again to loop through the result set without calling FindKeyword( ) again.

Several options are available to broaden or qualify the search. Refer to the Options[ ] property for more information.

The FindKeyword( ) can be provided with a portion of the data element tree as a starting point and will return all matching elements within that portion of the tree, or can be provided with no specific starting point and thus will query the whole data store.

Specifying a portion of the data store tree is similar to searching across all xxx, of the tree must have been fetched using the open( ) function prior to executing a search using the FindKeyword( ) function A relevant example could be:

Using Delphi:

```
Var
    b: boolean;
    i: olevariant;
[..]
if pDoc.Open([..]) then
    [..]
    if pDoc.FindKeyword['Media[]', 'CHEST PAIN'] > 0 then
    begin
        pDoc.FindFirst[i];
        repeat
            // the value of 'i' is the top root node satisfying the query
        until not pDoc.FindNext[i];
    end;
```

Using Active Server Pages:

```
Dim pDoc, i
[..]
if pDoc.Open([..]) then
[..]
    if (pDoc.FindKeyword("Media[]", "CHEST PAIN") > 0) and_
        (pDoc.FindFirst(i)) then
    do
        // the value of 'i' is the top root node satisfying the query
        [..]
    loop until not pDoc.FindNext(i)
end if
```

In both examples, an instance of ADM.Datagate (pDoc) is created and receives a connection to the data store. The pDoc instance is then loaded (open( )) to receive Media[ ] information, and the FindKeyword( ) function is executed to find all media articles that have the words chest and pain as keywords or concepts. Note that FindKeyword( ) returns the number of elements matching the criteria set. The first element is retrieved using the FindFirst( ) method. Note that FindFirst( ) returns a Boolean value to indicate if the call to FindFirst( ) was successful. After making use of this value, FindNext( ) is called to retrieve the next element. Note again that FindNext( ) returns a Boolean value to indicate if the call to FindNext( ) was successful. FindNext( ) will return FALSE when the last entry has been retrieved using FindNext( ).

OPTIONS

Results from the FindKeyword( ) function can be tuned to return a range of results using the Options[ ] property. For example, a search can also include close enough terms using the FUZZY option. All entries similar through Soundex algorithm to the original entry will be returned as well. The Option( ) property is set or accessed as a string.

For example, using Delphi:

```
pDoc.Options['FUZZY'] := 'TRUE';
if pDoc.FindKeyword['users', 'JOHN DOE'] > 0 then
[..]
Active Server Pages:
pDoc.Options("FUZZY") = "TRUE"
if pDoc.FindKeyword("users", "JOHN DOE") > 0 then
[..]
```

CHILDREN

The Children function is an interface function similar to Find( ) and FindKeyword( ): a search operation is scheduled, and results are retrieved using FindFirst, FindNext and optionally FindResult. Given a node code, Children( ) returns all child node codes. This function is useful when navigating any element tree, regardless of the semantics of the data. This function is especially useful in conjunction with FindResult( ): the administration utility is making extensive use of this feature.

For example, using Delphi:

```
if pDoc.Children[NodeCode] > 0 then
    if pDoc.FindFirst[iNode] then
    repeat
        [Use pDoc.FindResult[] to retrieve 'METATYPE',
            'METANODENAME',
'ARRAYINDEX', 'ARRAYINDEX', 'HASCHILDREN', etc for display]
    until not objDatagate.FindNext[iNode];
```

In this example. iNode contains the node code of the ith child node of 'NodeCode'.

NODEINFORMATION

The NodeInformation function is an interface function similar to Children( ): a search operation is scheduled, and results are retrieved using FindResult( ). Given a node code, NodeInformation( ) returns TRUE if such a node exists, FALSE otherwise. In many instances, a great deal more than a node code is required to proceed with the data element. Hence, NodeInformation( ) should be used in conjunction with FindResult( ), as FindResult function provides most of the necessary information. For more details regarding the use of the FindResult function, refer to its section.

For example, using Delphi:

```
if pDoc.NodeInformation[NodeCode] then
begin
    sCode := pDoc.FindResult['METANODECODE'];
    sName := pDoc.FindResult['METANODENAME'];
end;
```

FINDFIRST, FINDNEXT, FINDRESULT

FindFirst and FindNext function allow for data retrieval after performing a call to Find, FindKeyword or Children functions. All Find, FindKeyword and Children return a count as the result of the query. If this result is 0, then the query operation did not return any result. If this count is greater than 0, then calls to FindFirst and FindNext are required. Typical code example for using FindFirst and FindNext is as follows:

For example, using Delphi:

```
If pDoc.FindKeyword['users', 'JOHN DOE'] > 0 then
    if pDoc.FindFirst[iNode] then
        repeat
            // iNode is the code of the element found
            [..]
        until not objDatagate.FindNext[iNode];
    [..]
```

FindFirst and FindNext return TRUE if the data retrieval operation was successful, FALSE otherwise. In many instances, a great deal more than a node code is required to proceed with the data element. The FindResult( ) function provides most of the necessary information. After a FindFirst or FindNext, one can call the FindResult to find out about the data element value, meta node code and name, array index, data type, and if the data element has children. Possible values for the FindResult unique parameter are:

| Parameter | Description |
|---|---|
| MetaNodeCode | Number The meta node code corresponding to the element |
| MetaNodeName | String The meta node name corresponding to the element |
| ArrayIndex | Number Variant value - Empty if the element is not an array element, or a number otherwise. |
| Value | String The data value of the element. Contains the string value of the element if the data type is not a long, otherwise contains '<long>'. |
| MetaType | Number Contains the data type of the element. Refer to the DATATYPES section to translate this number value to a string. |
| HasChildren | Number - 0, if not children, greater than 0 if any child(ren) |

The function result is returned as a variant. For example,

For example, using Delphi:

```
if pDoc.FindFirst[iNode] then
    repeat
        varA := FindResult['METANODECODE'];
        varB := FindResult['ARRAYINDEX'];
        varC := FindResult['VALUE'];
        varD := FindResult['METATYPE'];
        varE := FindResult['METANODENAME'];
        varF := FindResult['HASCHILDREN'];
        [..]
    until not objDatagate.FindNext[iNode];
    [..]
```

MISCELLANEOUS

LASTERROR

The LastError( ) function reports the last errors that intervened during the calling application execution. Calling LastError( ) function will reset the error list.

IsA

This function accepts two parameters: 1) the string name of a meta node, and 2) a node code. The IsA( ) function will return true if the second parameter meta node code is either the meta node mentioned as first parameter, or a child meta node of the meta node mentioned as first parameter, otherwise returns false. For example, given the following meta node description:

A Top meta node

. .B Child of A

D Child of B

. .C Child of A

For a node n of meta node C, pDoc.IsA('A.C', n) is true, pDoc.IsA('A', n) is true and pDoc.IsA('A.B', n) is false.

For a node n of meta node B, pDoc.IsA('A.B.D', n), pDoc.IsA('A.B', n), pDoc.IsA('A', n) all return true, while pDoc.IsA('C.', n) or pDoc.IsA('A.C', n) return false.

Function Reference

| SetProfile | |
|---|---|
| Description | Function |
| | Set a connection between the Profile object and current IDatagate new instance. |
| Syntax | Procedure SetProfile(Profile: IProfile); |
| Example | DELPHI: |
| | var |
| |   pProfile, pDoc: OLEVariant; |
| | begin |
| |   try |
| |     pProfile := CreateOLEObjects('ADM.Profile'); |
| |     if pProfile.SetConnection['test', 'scott', 'tiger', 'host'] and |
| |       pProfile.Authenticate[1, '', ''] then |
| |     try |
| |       pDoc:= CreateOLEObject('ADM.Datagate'); |
| |       pDoc.SetProfile(pProfile) |
| |       [..] |
| |       pDoc:= unassigned; |
| |     except |
| |       [..] |
| |     end; |
| |     pProfile := unassigned; |
| |   except |
| |     [..] |
| |   end; |
| | end; |
| Open | |

-continued

| | |
|---|---|
| Description | Function<br>Initializes the COM objects with the data stored into the Adaptive Data Manager starting at root element intNodeCode.<br>Note that not all data is loaded: This object was designed using a 'load on demand' principle, where data is only fetched from the database when requested for the first time.<br>Note that a connection must have been established before calling Open. All loaded data is by default Read Only. Some data may have been previously locked, and consequently may be set as Read & Write.<br>Returns TRUE if successful, FALSE otherwise. If unsuccessful, possible reasons are failed database connection, invalid node code. Check the LastError function content for the cause of failure. |
| Syntax | function Open(intNodeCode: longint): boolean |
| Example | This example shows all steps to opening a record within ADM. The value 123456 is a node code, and is a the code for a root node code. Typically this value will be returned as part of a search (using Find or FindKeyword functions).<br>DELPHI:<br>var<br>  pProfile, pDoc: OLEVariant;<br>begin<br>  try<br>    pProfile := CreateOLEObjects('ADM.Profile');<br>    if<br>      pProfile.Open['Provider=OraOLEDB.<br>      Oracle.1;<br>      Persist Security Info=False;User ID=test;<br>      Data<br>      Source=tiger', 'test', 'scott', 'host'] and<br>      pProfile.Authenticate[1, '', ''] then<br>    try<br>      pDoc:= CreateOLEObject('ADM.Datagate');<br>      pDoc.SetProfile(pProfile)<br>      if pDoc.Open(123456) then<br>      begin<br>        [..]<br>      end;<br>      pDoc.Close;<br>      pDoc:= unassigned;<br>    except<br>      [..]<br>    end;<br>    pProfile := unassigned;<br>  except<br>    [..]<br>    end;<br>end; |
| Close | |
| Description | Procedure<br>Resets the data content of the IDatagate instantiated interface. Note that all locks that may have previously set on the data content will not be affected. Refer to CloseLock for removing locks. Any elements that may have been modified will not be saved to the data store.<br>This function always returns TRUE. |
| Syntax | Procedure Close; |
| Save | |
| Description | Function<br>Saves the data content of the IDatagate instantiated interface. Only non Read/Only elements (i.e. only elements that were successfully locked) will be saved to the data store.<br>Returns TRUE if successful, FALSE otherwise. If unsuccessful, check the LastError function content for the cause of failure.<br>Note that all locks are not removed after the Save operation. |
| Syntax | function Save: boolean; |
| Delete | |
| Description | Function<br>This function allows elements of opened records to be deleted, by specifying an identifier; all elements child of that identifier will be deleted as well. The identifier |

-continued

| | |
|---|---|
| | is any legal identifier. Note that the parent of the mentioned identifier must be read/write state: refer to the SetLock( ) function.<br>This function returns TRUE if successful, FALSE otherwise. If unsuccessful, check the LastError function content for the cause of failure. |
| Syntax | function Delete(strIdentifier: String): boolean; |
| SetLock | |
| Description | Function<br>Sets a database lock on the database node corresponding to the identifier. If successful, the identifier becomes Read & Write. Note that all identifier child elements are locked as well. The lock is based on the owner and session's code, thus allowing the same owner (i.e. user) to lock different elements for different sessions. Typically, the session will either be an IIS web server session ID, or an Oracle session ID. The owner and session are established when creating the parent IProfile interface, that is later communicated to the current IDatagate interface..<br>This function returns TRUE if successful, FALSE otherwise. If unsuccessful, check the LastError function content for the cause of failure. |
| Syntax | function SetLock(strIdentifier: String): boolean; |
| CloseLock | |
| Description | Function<br>Closes an identifier lock. The identifier data is reset Read Only mode. This function returns TRUE if successful, FALSE is the lock could get established. Setting a lock will be unsuccessful if another user already has a lock the requested data element. Check the LastError function content for the cause of failure. Check current locks using the ADM Administration Utility, Lock Tab, to list existing locks. |
| Syntax | function CloseLock(strIdentifier: String): boolean; |
| Find,<br>FindKeyword, | |
| Description | Function<br>The Find function allows for queries over the entire Adaptive database model. For example, one could query all node trees where node of meta node type 'Last Name' is 'Doe', and node of meta node type 'First Name' is 'John'. The logic of this function is based on sets, and thus allows for set intersections, differences and unions.<br>The FindKeyword( ) function allows for keyword or concept searches for a specified portion of the data store or for the whole data store. For example, if the Adaptive Data Manager data store has data elements about users and media articles, then one could look for all articles making references to 'Chest' and 'Pain', within the 'Media[ ]' branch. Note that the search is case insensitive<br>Find( ) and FindKeyword( ) functions will prepare the query and return the number (count) of entries that matched the query. The FirstFirst( ) and FindNext( ) functions will respectively return the first entry and the following entries. Note that one can loop through all results several times using FindFirst to reset the result index without having to re-submit Find.<br>Check the Options( ) function for possible behavior options.<br>➲Note that only data saved into the data store will be queried using this method. In order to have the data stored in memory also queried, Save the data first before performing a query. |
| Syntax | function Find(const strLookup: WideString): Integer;<br>function FindKeyword(const strIdentifier, strLookup: WideString): Integer; |
| Example | DELPHI:<br>Var<br>  b: boolean;<br>  i: olevariant;<br>[..]<br>if pDoc.Find['LAST_NAME = "YOUNG" AND FIRST_NAME="ANDRE"'] > 0 then<br>begin<br>  pDoc.FindFirst[i]; |

-continued

| | |
|---|---|
| | repeat<br>    // the value of 'i' is the top root node tisfying the<br>query<br>    until not pDoc.FindNext[i];<br>end; |
| Children | |
| Description | Function<br>Return the list of child elements for the 'node' parent element. The value for node is a node.node_code. The Children( ) function will prepare the query and return the number (count) of child elements for 'Node'. The FirstFirst( ) and FindNext( ) functions will respectively return the first entry and the following entries. Note that one can loop through all results several times using FindFirst( ) to reset the result index without having to re-submit Children( ).<br>Check the Options( ) function for possible behavior options. |
| Syntax | Function Children(Node: variant): longint |
| NodeInformation | |
| Description | Read-Only Property<br>This function allows returning database information about an existing node. |
| Syntax | property Identifier[intNodeCode: Integer]: String |
| FindFirst, FindNext | |
| Description | Function<br>Allows retrieval of node elements after Find( ), FindKeyword( ) or Children( ) functions. FindFirst( ) and FindNext( ) return TRUE if the operation was successful, FALSE otherwise. If unsuccessful, check the LastError function content for the cause of failure |
| Example | DELPHI:<br>var<br>  n, i: longint;<br>[..]<br>  n: = pDoc.Children['PATIENT.VISIT[ ]'];<br>  if pDoc.FindFirst[I] then<br>  repeat<br>    // the value of 'i' is the top root node satisfying the<br>query<br>    until not pDoc.FindNext[i]; |
| Syntax | Function FindFirst(out intRootCode: OLEVariant): WordBool;<br>Function FindNext(out intRootCode: OLEVariant): WordBool; |
| FindResult | |
| Description | Function<br>The FindResult( ) function is used in conjunction with FindFirst( ) and FindNext( ) functions. FindFirst( ) and FindNext( ) functions only return a node code; the FindResult( ) function allows to get additional information to the code returned by FindFirst( ) and FindNext( ).<br>METANOD   Number The meta node<br>METANOD   String The meta node<br>ARRAYIN    Number Variant value - number otherwise.<br>VALUE         String The data value of the element. Contains the string value of the element if the data type is not a long, otherwise contains '<long>'.<br>METATYPE   Number Contains the data type of the element. Refer to the DATATYPES section to translate this number value to a string.<br>HASCHIL    Number - 0, if not<br>DREN          children, greater than 0 if any child(ren) |
| Syntax | Function FindResult(Entry: OLEVariant): OLEVariant; |
| Options | |
| Description | Property<br>The Options property allows Datagate options to be set or accessed. Current Options are:<br>'FUZZY': Allows Soundex search mode for |

-continued

| | |
|---|---|
| | FindKeyword function.<br>'MAX CHILDREN': Limits the maximum<br>number of children that can be retrieved using the<br>Children( ) function. |
| Syntax | Property Options(const strValue: WideString):<br>OleVariant; |
| SessionID | |
| Description | Read-Only Property<br>Returns the SessionID value previously set by the<br>Open function. If used previously to any Open<br>function call, returns −1. |
| Syntax | Function SessionID: longint; |
| Owner | |
| Description | Read-Only Property<br>Returns the Owner value previously set by the Open<br>function. If used previously to any Open function<br>call, returns −1. |
| Syntax | Function Owner: longint; |
| XML | |
| Description | Read & Write Property<br>This property allows for all data for the current root<br>node to be exported as XML, or for a block of XML<br>to be imported either under the current root node or<br>under any node element (use the sStart value to<br>specify the start node; leave this value to start under<br>the root node). Check the LastError content for<br>possible failure. |
| Syntax | Property XML[sStart: String]: String; |
| Value | |
| Description | Read & Write Property<br>This property allows setting or getting a value for an<br>identifier.<br>Note that the transferred value is a variant, and thus<br>may cause conversion errors. Check the LastError<br>content for possible failure. |
| Syntax | Property Value[strIdentifier: String]: Variant |
| Add | |
| Description | Read-Only Property<br>This property allows for next array records to be<br>created into an array. This property returns the index<br>of the next created array record. The identifier<br>specified into the function must be an array (thus<br>have the [ ] notation.)<br>This function will return −1 in case of failure; in this<br>case, check the content of LastError. |
| Syntax | Property Add[strIdentifier: String]: integer |
| Count | |
| Description | Read-Only Property<br>This property returns the number of child nodes if the<br>element specified by strIdentifier is an array. If the<br>identifier element has a discrete data type (string,<br>integer, real, date, or boolean) then accessing this<br>property will cause an exception. Check the LastError<br>content for possible failure. |
| Syntax | Property Count[strIdentifier: String]: longint |
| IsA | |
| Description | Read-Only Property<br>This property checks if the instance data referred to<br>by intNodeCode is of type meta data strIdentifier.<br>This function returns TRUE if the operation was<br>successful, FALSE otherwise. Check the LastError<br>content for possible failure. |
| Syntax | function IsA(const strIdentifier: WideString;<br>intNodeCode: Integer): WordBool; |
| IsReadOnly | |
| Description | Read-Only Property<br>This property returns TRUE if an identifier is Read &<br>Write, FALSE if Read Only. Refer to the Lock<br>function for setting an identifier as Read & Write.<br>Check the LastError content for possible failure. |
| Syntax | Property IsReadOnly[strIdentifier: String]: boolean |
| IndexOf | |
| Description | Read & Write Property<br>This property sets or gets the current index for an<br>array node. Check the LastError content for possible<br>failure. |
| Syntax | Property IndexOf[strIdentifier: String]: longint |
| Datatype | |
| Description | Read-Only Property |

-continued

| | |
|---|---|
| | This property returns the data type of a node as an integer. Possible values are number for String, Integer, Real, Date, Long String, Boolean, Array, Array Record and Virtual Array. Note that the metadata data type cannot be altered through this interface, and can only be managed using the ADM Administration Utility. Check the LastError content for possible failure. |
| Syntax | Property Datatype[strIdentifier: String]: longint |
| LastError | |
| Description | Read-Only Property This property returns the error log as text. Calling this function resets the error log content. All errors met until the LastError function call are part of the error log. |
| Syntax | Property LastError: Variant |
| CurrentIndex | |
| Description | Write-Only Property This property sets the identifier specified as the argument of this function to be the current index. Check the LastError content for possible failure. Note that this function was designed to work in conjunction with the TopNode( ) and Identifier( ) functions. |
| Syntax | property CurrentIndex: String |
| Identifier | |
| Description | Read-Only Property This function returns a fully defined identifier given the node code specified as unique parameter. This function is especially useful for indexing and searching purposes. |
| Syntax | property Identifier[intNodeCode: Integer]: String |
| TopNode | |
| Description | Read-Only Property For any node element code, this function returns the top element node code. This function is usually used by passing the node element code obtained from FindFirst( ) or FindNext( ). from Check the LastError content for possible failure. |
| Syntax | property TopNode[intNodeCode: Integer]: Integer |
| Code | |
| Description | Read-Only Property This function returns the node element associated with any identifier. This function will return −1 if the element has not been saved to the database yet. |
| Syntax | Property Code[strIdentifier: String]: OleVariant |
| Order | |
| Description | Read / Write Property This function sets and returns the current subscript order of an array element. If the new subscript value is out of legal array bound, then no action is taken. |
| Syntax | property Order[strIdentifier: WideString]: Integer |
| IdentifierItem, IdentifierItemCount | |
| Description | Read Only Property These functions are 'helper' functions and allow for identifier string manipulations. For any legal identifier strings, the IdentifierItemCount( ) function returns the number of segments within the string, and IdentifierItem( ) returns the segment as a string. |
| Syntax | Function IdentifierItem(strIdentifier: String; Index: longint): String; Function IdentifierItemCount(strIdentifier: String): longint; |

ADM.Index

ADM.Index is the interface, supporting document indexing, under the Adaptive Data Manager paradigm. Indexing is declared at the meta data level in the form of indexing flags, and any creation of corresponding instance data will trigger the creation of entries into a 'request for data processing' queue. This queue lists all ADM.Datagate elements that are waiting for indexing. Indexing consists of analyzing each pending element and computing or establishing the relevant set of keywords and/or concepts that best describe the element. The resulting keywords will be sent to an index storage that will be accessed in turn by the ADM.Datagate interface.

This interface provides two basic functions:

Access to the data processing queue.

ADM.Index provides all means to query the data processing queue, lock entries for processing and remove from the queue processed items.

Access to the indexing storage.

ADM.Index provides all means to query existing concepts and keywords, add new concepts and keywords, or clear existing entries.

ADM.INDEX TOOLS AND FUNCTIONS
QUEUE MANAGEMENT
QUEUECOUNT, QUEUE, LOCKQUEUE, UNLOCKQUEUE, CLOSEQUEUE,
QUEUEVALUE

The Queue and QueueCount provide the means to browse existing queue entries. A queue entry contains a reference to a particular element from the ADM.Datagate storage, as well as a creation date, and possibly a reference to a user processing this entry. The QueueValue function retrieves the stream of text that is queued to be concept/keyword indexed. Eventually, the LockQueue, UnlockQueue and CloseQueue functions provide queue management: LockQueue provides exclusive access to a queue element, UnlockQueue releases the exclusive access, while CloseQueue removes the element from the queue.

The current state of the queue is buffered internally into the ADM.Index object. Each time an access is made to QueueCount, the buffer is refreshed.

A typical example of use of these functions would be as follows:

For example, using Delphi:

```
// pProfile Created
[..]
pIndex := CreateOLEObject('ADM.INDEX');
pIndex.SetProfile(pProfile)
for i := 0 to pIndex.QueueCount 1 do
    if pIndex.Queue[i, iNode, iUserCode, datCreated, intState] and
        pIndex.LockQueue[iNode, kiUSER] then
    begin
        if pIndex.QueueValue[iNode, ws] then
        [..] // Processing happen here for making keywords.
        pIndex.CloseQueue[iNode, kiUSER];
    end;
pIndex := unassigned;
```

In other words, this example shows the queue to be opened (SetProfile( ), QueueCount( )) and browsed (Queue( )), each queue element is locked for exclusive use (LockQueue( )), the value of a queue element is accessed (QueueValue( )), and the queue element is removed from the queue (CloseQueue( )).

WORDINDEXCOUNT, WORDINDEX, CLEARWORDINDEX, ADDWORDINDEX

The WordIndex( ) and WordIndexCount( ) functions provide the means to browse existing index entries for a specific ADM.Datagate element. Note that the list of index keywords and concepts for a specific element is buffered internally. This buffer is refreshed each time the WordIndexCount( ) function is accessed. An index entry contains a reference to a particular element from the ADM.Datagate storage, as well as a source and a text. The source identifies what concept domain was used to create the index text entry. For example, valid domains are FREETEXT, ICD, CPT, etc. The ClearWordIndex( ) function removes existing entries for a ADM.Datagate element, while AddWordIndex( ) creates new index entries.

MISCELLANEOUS
LASTERROR

The LastError( ) function reports the last errors that intervened during the calling application execution. Calling LastError( ) function will reset the error list.

SETPROFILE

Instantiating the COM object is the first step to being able to data access. The second step consists in establishing a connection to the data store, i.e. the relational database storage. This is effective using the SetProfile( ) function, by connection this instance of the IIndex interface to a previously created instance of IProfile interface.

Function Reference

| | |
|---|---|
| QueueCount | |
| Description | Read-Write Property<br>Returns the current number of data processing queue entries. |
| Syntax | property QueueCount: Integer; |
| Queue | |
| Syntax | property Queue[intIndex: Integer; out intNodeCode: Integer; out intUserCode: Integer; out datCreated: OleVariant; out intState: OleVariant]: boolean |
| LockQueue, UnlockQueue, CloseQueue | |
| Syntax | property LockQueue[intNodeCode: Integer; intUserCode: Integer]: boolean<br>property UnlockQueue[intNodeCode Integer; intUserCode: Integer]: boolean<br>property CloseQueue[intNodeCode: Integer; intUserCode: Integer]: boolean |
| QueueValue | |
| Syntax | property QueueValue[iNodeCode: Integer; out wsString: WideString]: boolean |
| WordIndexCount | |
| Syntax | property WordIndexCount[intNodeCode: Integer]: Integer |
| WordIndex | |
| Description | Read-Write Property<br>Retrieves any index element for a ADM.Datagate element. |
| Syntax | property WordIndex[intNodeCode: Integer; intIndex: Integer; out strSource: OleVariant; out strCode: OleVariant; out intWeight: Integer]: boolean |
| ClearWordIndex | |
| Description | Read-Write Property<br>Clear up any word index for a specific ADM.Datagate element. |
| Syntax | property ClearWordIndex[intNodeCode: Integer]: boolean |
| Add WordIndex | |
| Description | Read-Write Property<br>Add a new word index for a specific ADM.Datagate element. |
| Syntax | property Add WordIndex[intNodeCode: Integer; strSource: OleVariant; strCode: OleVariant; intWeight: Integer]: boolean |
| SetProfile | |
| Description | Function<br>Set a connection between the Profile object and th current IDatagate new instance. |
| Syntax | Procedure SetProfile(Profile: IProfile); |
| Example | DELPHI:<br>Var<br> pProfile, pObj: OLEVariant;<br>begin<br>//pProfile is created here or has already been created<br>[..]<br>try<br> pObj := CreateOLEObject('ADM.INDEX);<br> pObj.SetProfile(pProfile);<br> [..]<br> pObj := Unassigned;<br>except<br> raise;<br>end; |

| | -continued |
|---|---|
| | end;<br>ACTIVE SERVER PAGES:<br><%@ Language=VBScript %><br><%<br>Option Explicit<br>On Error Resume Next<br>Dim pObj<br>Set pObj =<br>Server.CreateObject("ADM.INDEX")<br>pObj.SetProfile(pProfile);<br>[..]<br>Set pObj = nothing<br>%> |
| LastError | |
| Description | Read-Only Property<br>This property returns the error log as text.<br>Calling this function resets the error log<br>content. All errors met until the LastError<br>function call are part of the error log. |
| Syntax | Property LastError: Variant |

ADM.DICTIONARY

The ADM.Dictionary COM object provides an access to the standard Adaptive Data Manager lookup dictionary. All lookup dictionary entries are classified using a type: for example 'Gender', 'Age Group', etc. Each dictionary entry is then made a code and a description. This object provides different methods for accessing lists of codes and descriptions for a specific dictionary type, or for retrieving the description for a specific dictionary type and code.

ADM.Dictionary Tools and Functions

ESTABLISHING A CONNECTION TO A DATA STORE

Instantiating the COM object is the first step to being able to data access. The second step consists of establishing a connection to the data store, i.e. the relational database storage. This is effective using the SetProfile( ) function.

Examples:

For example, using Delphi:

Var pDoc: Idictionary;

[..]

pDoc:=CreateCOMObject('ADM.Dictionary');

pDoc.SetProfile(pProfile);

[..]

pDoc:=nil;

Active Server Pages:

dim pDoc pDoc=CreateOLEObject("ADM.Dictionary")

pDoc.SetProfile(pProfile)

[..]

pDoc=nothing

Setting up the IDictionary interface instance with a IProfile interface establishes a connection to the ADM data store. The connection to the data store is closed when the object is de-instantiated.

RETRIEVING LOOKUP CODES AND DESCRIPTIONS BY LOOKUP TYPE

ITEMCOUNT, ITEMCODE, ITEMDESCRIPTION

ADM.Dictionary lookup data is usually retrieved using two distinct methods: either one has a dictionary lookup type and code and wants to obtain the corresponding lookup description, or one wants to retrieve all lookup code & description pairs for a specific lookup type. The ItemCount( ) function returns the number of lookup code & description pairs for a specific lookup type, and the ItemCode( ) and ItemDescription( ) functions respectively return the code and description for a lookup type and collection index. This type of use is typical when populating combo boxes, list boxes, etc.

For example, using Delphi:

```
Var
    i: longint;
[..]
for i := 0 to pDoc.ItemCount['DATA_TYPE'] 1 do
    showMessage(pDoc.ItemCode['DATA_TYPE', i] + ' ' +
        pDoc.ItemDescription['DATA_TYPE', i]);
```

Using Active Server Pages:

```
Dim i
[..]
for i = 0 to pDoc.ItemCount('DATA_TYPE') 1
    response.write pDoc.ItemCode['DATA_TYPE', i] & " " &
        pDoc.ItemDescription['DATA_TYPE', i] & "<br>"
next
```

In both examples, the i subscript is the index for getting all code/description pairs.

ITEMDESCRIPTIONBYCODE

The second retrieval method consists of looking for a description corresponding to a lookup type and code pair. The ItemDescriptionByCode( ) function will return such a value.

MISCELLANEOUS

LASTERROR

The LastError( ) function reports the last errors that intervened during the calling application execution. Calling LastError( ) function will reset the error list.

Function Reference

| SetProfile | |
|---|---|
| Description | Function<br>Set a connection between the Profile<br>object and the current IDictionary new<br>instance. |
| Syntax | Procedure SetProfile(Profile: IProfile); |
| Example | DELPHI:<br>Var<br>    pProfile, pObj: OLEVariant;<br>begin<br>    // pProfile is created here or has already<br>    been created<br>    [..]<br>    try<br>        pObj :=<br>CreateOLEObject('ADM.DICTIONARY)<br>;<br>        pObj.SetProfile(pProfile);<br>        [..]<br>        pObj := Unassigned;<br>    except<br>        raise;<br>    end;<br>end;<br>ACTIVE SERVER PAGES:<br><%@ Language=VBScript %> |

| | -continued |
|---|---|
| | <%<br>Option Explicit<br>On Error Resume Next<br>Dim pObj<br>Set pObj =<br>Server.CreateObject("ADM.DICTIONARY")<br>pObj.SetProfile(pProfile);<br>[..]<br>Set pObj = nothing<br>%> |
| ItemCount | |
| Description | Read-Only Property<br>This property returns the count of lookup code & description pairs for a specific lookup type. |
| Syntax | property ItemCount[strType: String]: Variant |
| ItemCode | |
| Description | Read-Only Property<br>This property returns the intIndex$^{th}$ lookup code for a specific lookup type. Note that intIndex ranges from 0.. count − 1. Count is issued from ItemCount( ). |
| Syntax | property ItemCode[strType: String; intIndex: Integer]: Variant |
| ItemDescription | |
| Description | Read-Only Property<br>This property returns the intIndex$^{th}$ lookup description for a specific lookup type. Note that intIndex ranges from 0.. count − 1. Count is issued from ItemCount( ). |
| Syntax | Property ItemDescription[strType: String; intIndex: Integer]: Variant |
| ItemDescriptionByCode | |
| Description | Read-Only Property<br>This property returns the lookup description for a specific lookup type and code. |
| Syntax | property ItemDescriptionByCode[strType: String; strCode: String]: Variant |
| LastError | |
| Description | Read-Only Property<br>This property returns the error log as text. Calling this function resets the error log content. All errors met until the LastError function call are part of the error log. |
| Syntax | Function LastError: String; |

Appendix A:

COM Interfaces Calling Reference

A COM object can be instantiated using three basic distinct solutions:

USING OLE:

This is usually referred to as 'late binding'; the code makes reference to objects; these references will be resolved when the code is just about to execute. This is extremely flexible but rather dangerous, as the underlying COM object may change and disrupt applications using late binding.

For Example, using Delphi:

```
var
    a: OLEVariant;
begin
    a := CreateOLEObject('ADM.PROFILE');
    if a.Open['Provider=OraOLEDB.Oracle.1;Persist Security
        Info=False;User ID=test;Data Source=tiger', 'test', 'scott', 'host']
        and a.Authenticate[1, '', ''] then
    [..]
    a := unassigned;
end;
```

Note that it is important to de-instantiate the OLE object after use, by writing under Delphi a := unassigned; or by writing under ASP a = nothing

USE COM AND TYPE LIBRARIES

This is usually referred to as 'early binding'. The compiler can check that COM object references are actually legal, and thus can display compilation errors, while creating the application executable. For Example, using Delphi:

```
var
   a: IProfile;
begin
   a := CreateComobject(CLASS_Profile) as Profile;
   if a.Open['Provider=OraOLEDB.Oracle.1;Persist Security
      Info=False;User ID=test;Data Source=tiger', 'test', 'scott', 'host']
      and a.Authenticate[1, '', ''] then
   [..]
   a := nil;
end;
```

Again, note that it is important to de-instantiate the COM object after use, by writing under Delphi a := nil;

A variant to this solution is to use DCOM: this is actually using COM interfaces registered on a remote computer. DCOM is very similar to running COM. Again a type library is required when compiling the application. For example, For Example, using Delphi:

```
var
   a: IProfile;
begin
   a := CreateremoteComobject('\\test', CLASS_Profile) as Profile;
   if a.Open['Provider=OraOLEDB.Oracle.1;Persist Security
      Info=False;User ID=test;Data Source=tiger', 'test', 'scott', '\\test']
      and a.Authenticate[1, '', ''] then
```

```
         [..]
         a := nil;
         end;
```

In this previous example, '\\test' is the host (remote) computer.

USING MTS

Any COM thread runs as a regular process, and thus is able to destabilize the host computer. MTS brings about a context that allows the machine to be shielded against COM object misbehavior. For example:

For Example, using Delphi:

```
var
   TransactionContextEx: ITransactionContextEx;
   a: IProfile;
begin
   TransactionContextEx := CreateTransactionContextEx;
   try
     OleCheck(TransactionContextEx.CreateInstance(CLASS_Profile,
IProfile, a));
     if a.Open['Provider=OraOLEDB.Oracle.1;Persist Security
        Info=False;User ID=test;Data Source=tiger', 'test', 'scott', 'host']
        and a.Authenticate[1, '', ''] then
        [..]
   except
     TransactionContextEx.Abort;
     raise;
   end;
   TransactionContextEx.Commit;
end;
```

Atty Docket No. 0214-0001

INTRODUCTION TO MANAGEMENT TOOL FOR ADM

This document is a user manual for the management tool for the Adaptive Data Manager (ADM) object. It provides a guide and descriptions of all features that are part of this tool. The reader should be aware of ADM's capability before using this tool. Please consult the '*ADM COM User Manual*' for in-depth information. This tool is a utility provided to application developers and does not pretend to be an application for the end-user. This tool provides all features to manage the ADM Meta model, explore the instance data, resolve instance data locks, etc. This tool covers eight different aspects of ADM:

- Directory Security Management.

The ADM universe consists of classes of objects (facility, user group, user, meta data, meta view, application and dictionary). The 'directory' describes the relationships linking objects as privileges, thus establishing comprehensive security.

- User Management.

User management consists of creating and managing users that have access rights to ADM.

- Facility Management.

Facility management consists of creating and managing physical entities possibly identifying distinct data sections of ADM.

- Meta Data Management.

Prior to any processing, ADM requires a Meta data model to be defined. This section of the tool manages all aspects of the Meta data model.

- Meta View Management.

Any Meta model can be represented as a *tree* or a *graph*. Providing such a model does not easily enable end users to query on their own the instance data. The Meta views allow mapping of Meta data structures into one-dimensional structures, such as tables.

- Instance Data Management.

Instance data is the user data that was modeled after the Meta data. For

Atty Docket No. 0214-0001 example, it is rather difficult during application development to explore the instance data in order to know whether the application was successful in inserting, updating or deleting instance data. This tool provides all means to browse and even alter the instance data.

- Dictionary Management.

Application developers may create Meta data elements referring by number to a list of descriptions. The dictionary is a collection of lists, identified by a type. The type is what the Meta data element refers to. A type list is a collection of code and descriptions ordered by position. This section of the tool allows all possible management about dictionaries.

- Instance Data Lock Management.

ADM allows applications to simultaneously access the same information, while allowing only one application to have modifications rights onto the instance data. This section of the tools allows for browsing and deleting locks.

Connecting to the Adaptive Data Manager

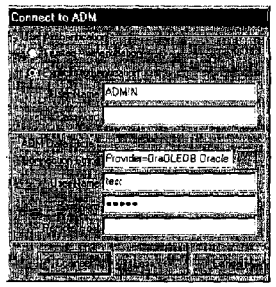

The ADM Administration tool requires all users to log in to a specific ADM data store and to authenticate themselves before access to the administrative sections. Connecting to an ADM data store requires a database connection string, a database *User Name* and *Password*. Optionally, ADM services may be hosted on a remote computer (using DCOM and MTS services), and a computer name string may be supplied into the *Remote Host* field. The user is required to provide an authentication: this authentication may be trusted, whereas the ADM Administration tool gathers network operating system user credentials and applies

65

Atty Docket No. 0214-0001 them for ADM user authentication, or explicit, whereas the user must supply a *User Name* and *Password*.

User level of privilege is recognized at user logon (by evaluating the 'directory'); the user interface of the ADM Administration tool is customized accordingly to this level.

Directory Management

Introduction

Directory management consists of establishing security and privileges among *objects* available in ADM. Objects are classes of resources available under ADM: these can be *facility, user group, user, meta data, meta view, application* and *dictionary* entries. A directory *object entry* either represents all object entries of the object class, or only one object of that object class. For example a user entry may either represent 'User J. Doe' or 'All Users'.

The directory aims to represent any possible privilege relationships among objects. Note that there may be many ways to represent the same security model. Object Privileges are hierarchical and are organized as *trees*; objects located below a specific object inherit the security rights established for that specific object. Each object is assigned *rights*. Rights are specific by object classes; For example, rights for the User object are *Create, Read, Delete* and *Update*.

Setting the object privileges will affect this tool's user experience for all users. A user will have access to ...

- The *Directory* and *User* sections, if the current user has any of the *user* object rights,
- The *Facility* section, if the current user has any of the *facility* object rights,
- The *Meta Data, Instance Data* and *Lock* sections, if the current user has any of the *meta data* object rights,
- The *Meta View* section, if the current user has any of the *meta view* object rights,
- The *Dictionary* section, if the current user has any of the *dictionary* object rights.

Atty Docket No. 0214-0001

Administration

Figure 11:
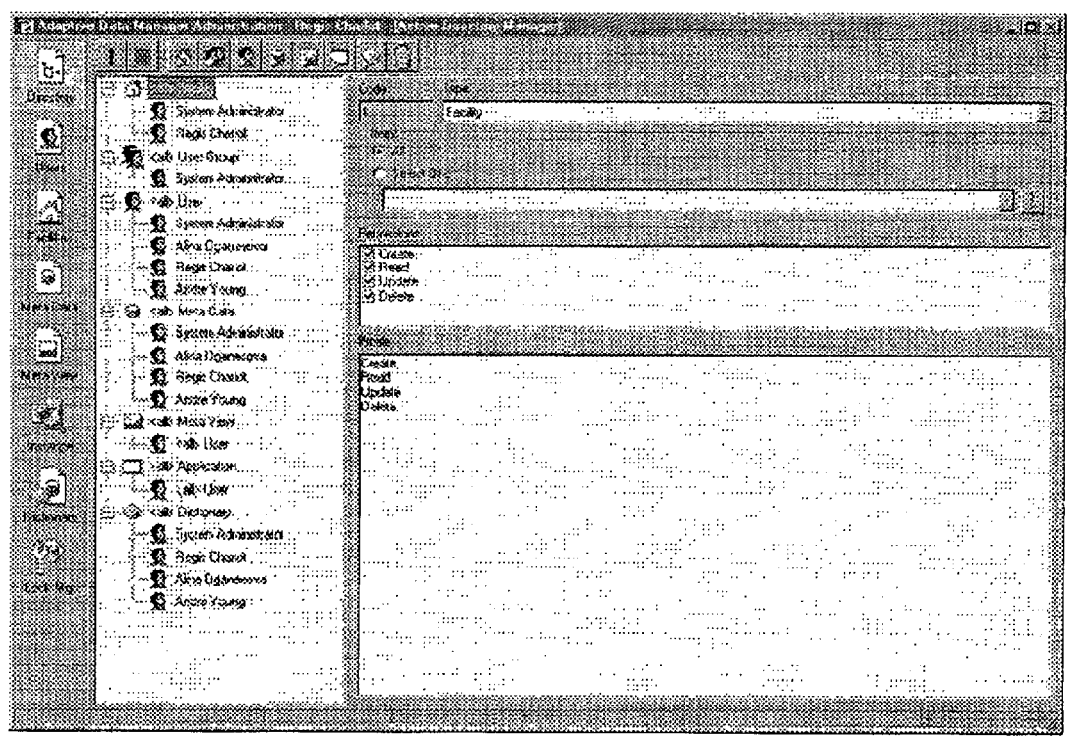
FIG. 11 is a screen of the ADM Adminstration Utility Directory.

Turning to FIG. 11, the Active Directory Manager is shown.

Directory Hierarchy Structure

The Directory section presents the directory structure as a tree. Clicking on the [+] symbol on the left hand side of each object expands this object to show child objects. Clicking on the [-] symbol on the left hand side collapses this object's child objects. The directory section primarily allows building the directory object hierarchy.

The following operations are possible on the object hierarchy:

- Refreshing the Directory (using the context sensitive menu 'Refresh' or toolbar icon ).
- Saving the Directory (using the context sensitive menu 'Save' or toolbar icon ).
- Adding a new Facility (using the context sensitive menu 'Add Facility' or toolbar icon ).
- Adding a new User Group (using the context sensitive menu 'Add Group' or toolbar icon ).
- Adding a new User (using the context sensitive menu 'Add User' or toolbar icon ).
- Adding new Meta Data (using the context sensitive menu 'Add Meta Data' or toolbar icon ). Note that specifying the object as a specific meta data element (as opposed to all meta data elements) is also extended to all child meta node elements of that meta node element.
- Adding new Meta View (using the context sensitive menu 'Add Meta View' or toolbar icon ).
- Adding new Application, also sometimes referred to as Script, (using the context sensitive menu 'Add Application' or toolbar icon ).
- Adding new Dictionary (using the context sensitive menu 'Add Dictionary' or toolbar icon ).

Atty Docket No. 0214-0001

- Deleting (using the context sensitive menu 'Delete' or toolbar icon ).

Any operation on the directory is pending until it is committed to the database by Saving the directory. User interface changes will be reflected at that time.

Directory Object Properties

The right hand side the directory form shows directory object properties. The properties are

- The object class type, either *Facility, User Group, User, Meta Data, Meta View, Script* or *Dictionary*.
- The object item, either All object of the object class type, or a specific object instance. For example, an object of type *User* may either represent 'User J. Doe' or 'All Users'.
- The object permissions. The permission are object specific. For example, permissions for the meta data object class are *Create, Read, Update* and *Delete*. Permissions are displayed into a check list box: select permissions by check the corresponding permission check boxes.

Selecting any object properties updates the selected object as properties are selected. The profile window shows the object permissions in context with the currently logged user.

User Management

Introduction

User management consists of creating and managing users that have access rights to ADM. Note that any modification to any ADM data store entries is tagged with the current user code and a date. User management is primarily focused on tracking users and creating and maintaining authentication credential. A user is authenticated using either explicit authentication (using a user name and password) or using trusted authentication (by retrieving authentication credentials established by the network operating system.) Note that users may have one or many trusted and/or explicit authentications.

User management is the highest privilege within the ADM Administration tool. A user granted user management privilege rights is also granted management of the *Directory* section.

Administration

Figure 12:
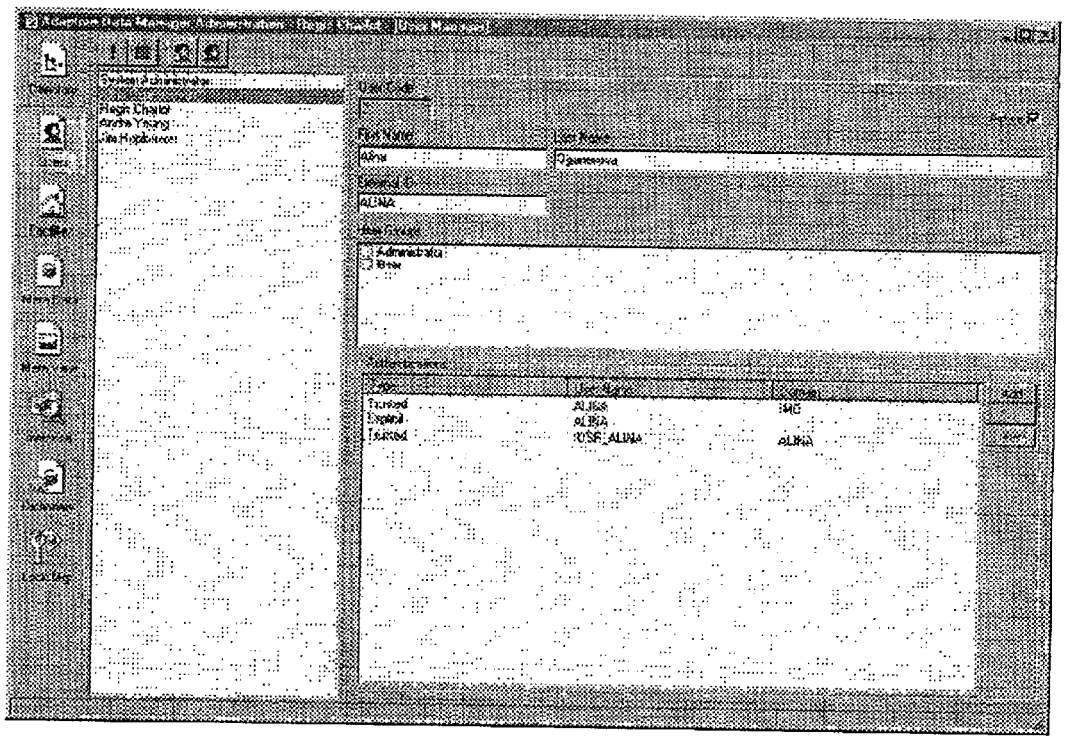
FIG. 12 is a screen of the ADM Adminstration Utility User Manager.

Turning to FIG. 12, the User Manager screen is shown.

The User section presents the list of users on the left hand side. Selecting a user displays user properties on the right hand side.

User properties consist of the user last and first name, an external user ID as well as an active check box. Checking off the user Active check box will disable the user: the user will no longer have access to ADM. The bottom part of the right hand side of the User section shows user authentications. This portion allows adding, editing or deleting user authentications. Add or editing a user authentication will display the following popup window:

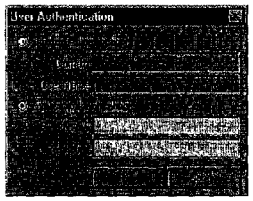

Note that this popup window allows for entry of both trusted and explicit authentications.

Administrative Functions

The following administrative functions are available:

- Refreshing User information (using the context sensitive menu 'Refresh' or toolbar icon ).
- Saving User information (using the context sensitive menu 'Save' or toolbar icon ).
- Adding a new user (using the context sensitive menu 'Add' or toolbar icon ).
- Deleting a user (using the context sensitive menu 'Delete' or toolbar icon ).

Atty Docket No. 0214-0001

Facility Management

Introduction

Facility management consists of creating and managing placeholders for physical entities such as corporation departments, satellite offices, etc. Using the directory, it is then possible to assign users rights and privileges under each facility. Facility management is primarily focused on creating and maintaining facility basic information. Note that a facility setup may include a preference for user's explicit or trusted authentication.

This section will only appear to the user if the user is granted privilege to the 'All' Facility class of objects.

Administration

The four administration functions are refreshing the list of facilities, save changes made, and adding or deleting a facility. Facility properties consists of the facility name, the preferred user authentication type for the facility, and if the facility is active.

Figure 13:
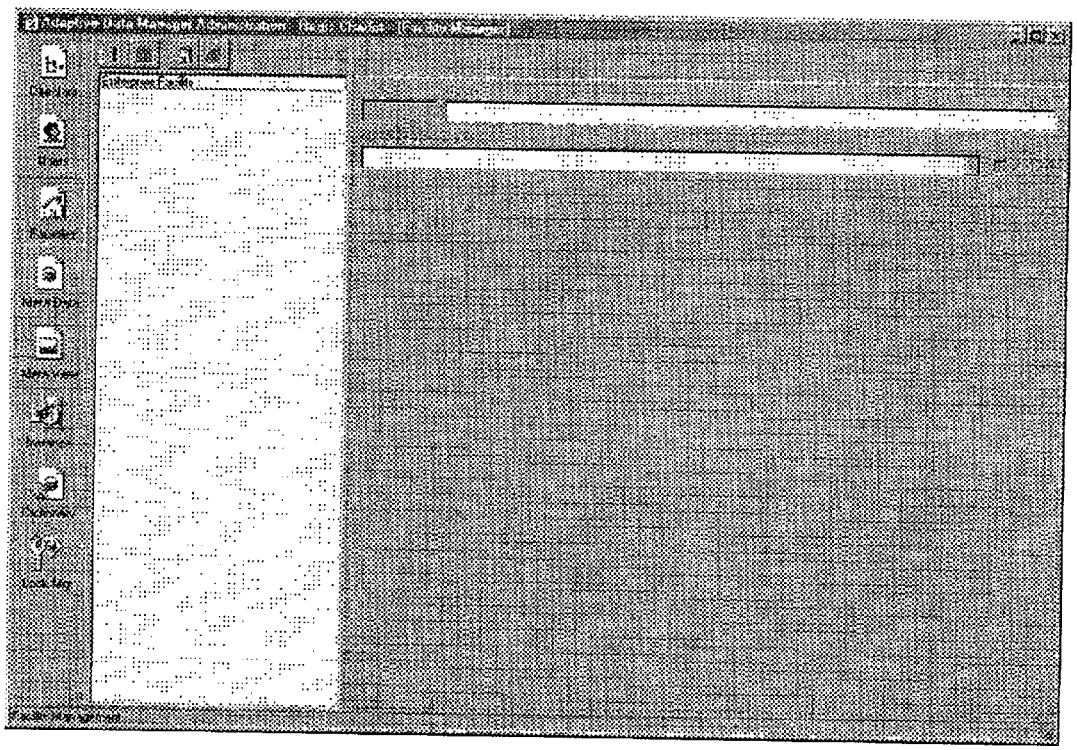
FIG. 13 is a screen of the ADM Adminstration Utility Facility Manager.

Turning to FIG. 13, the Facility Manager screen is shown.

Administrative Functions

- Refreshing the facility list (using the context sensitive menu 'Refresh' or toolbar icon ).
- Saving changes to the facility list (using the context sensitive menu 'Save' or toolbar icon ).
- Adding a facility (using the context sensitive menu 'Add Facility' or toolbar icon ).
- Deleting a facility (using the context sensitive menu 'Delete Facility' or toolbar icon ).

Meta Data Management

Introduction

Meta data represents the definition of the data that will be collected. In other words, the Meta data defines the shapes and attributes of the instance data and prepares the database for receiving the end user's application data. For more Atty Docket No. 0214-0001 information about Meta Data, refer to the *ADM COM User Manual* document, '*Data Store Model*' Section.

Administration

Meta data administration is granted to the current user if the user has privileges on
5   the 'All' Meta Data Class of objects.

Figure 14:
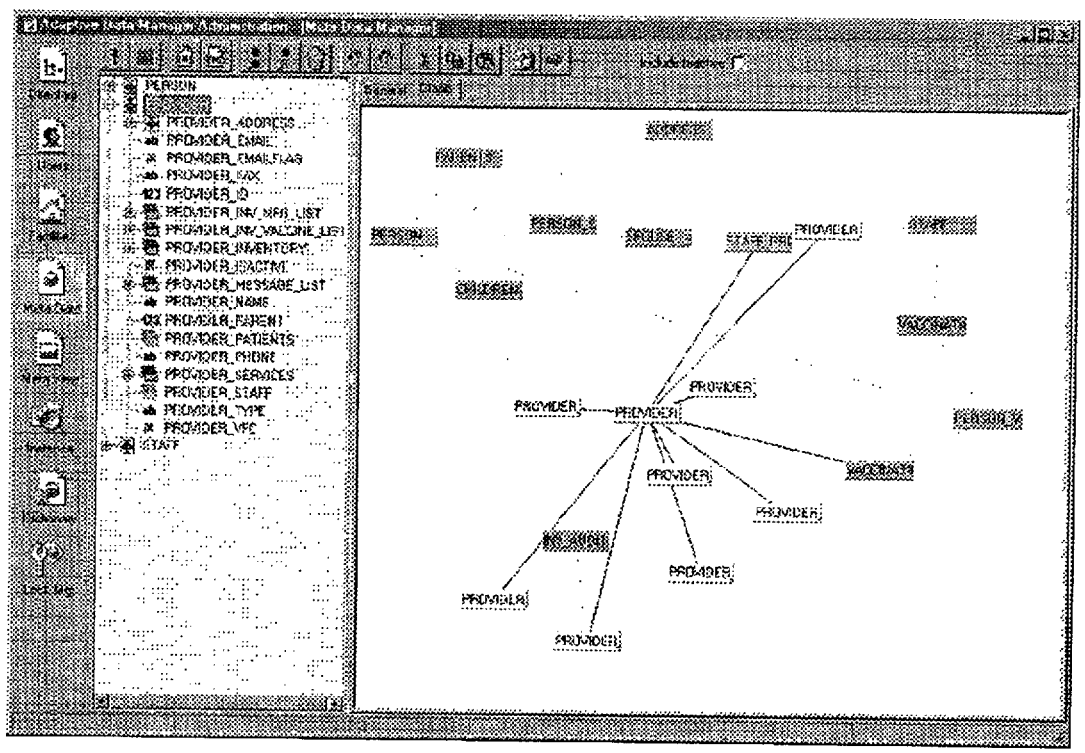
FIG. 14 is a screen of the ADM Adminstration Utility Meta Data Manager.

There is only one Meta data model per ADM data store (i.e. database user.) Meta data is organized as a tree. There can be several Meta data roots to the Meta data model. Turning to FIG. 14, the Meta Data Manager is shown with a 'PROVIDER' root.

The tool allows for Meta data elements to be browsed, added and removed.
10  Browsing the Meta data set is done using the left-hand side (tree view) field by clicking on the [+] or

[-] bitmaps, or by double-clicking on the Meta element names. All attributes for a Meta element are shown on the right hand side. Modifying attributes does not alter the database immediately. Changes are only submitted to the database when 'saving' the Meta data to
15  the database. Note that the Meta data model can be refreshed (i.e. re-read) from the database. If the Meta data was in a modified state, the user is prompted to save or ignore changes prior to refreshing the Meta data display. Only Meta elements that have been changed are saved to the database. Notes that are deleted from the Meta model are in fact 'archived'. The Meta data is still present but no longer displayed to the user. Note that the
20  list of data types is hard coded to the application and thus cannot be changed. The list of flags is based on a system dictionary list, and is set by default at system installation. The icon on the left hand side of each meta data element visually indicates the data type of the element. Possible icons are:

| # | Icon | Data type Name | Description |
|---|------|----------------|-------------|
| 0 | 🖳 | Container | The *Container* data type is to provide a logical meta data group to child meta data elements. |
| 1 | ab | String | A *String* data type allows storage of character strings up to 255 characters. |
| 2 | 123 | Integer | The Integer data type is a signed 32- |

Atty Docket No. 0214-0001

|   |     |              |                                                          |
|---|-----|--------------|----------------------------------------------------------|
|   |     |              | bit integer, ranging from -2147483648 to 2147483647.     |
| 3 | 0.1 | Real number  | The Real data type is a number storing values ranging from $5.0 \times 10^{-324}$ to $1.7 \times 10^{308}$. |
| 4 |     | Date         | The *Date* data type is used to hold date and time values. |
| 5 |     | Long String  | The *Long String* data type allows storage of strings up to 4294967294 characters. This data type is slower to handle than the *String* data type. |
| 6 |     | Boolean      | The *Boolean* data type holds *TRUE* or *FALSE* values.  |
| 7 |     | Array        | The Array data type is very similar to the Container data type, as it provides a logical meta data group to child meta data elements. As opposed to the *Container* data type, the *Array* data type may have none or many child array records of child meta data elements. |
| 9 |     | Virtual Array | The *Virtual Array* data type allows the creation of arrays with child elements belonging to another *Array* data type meta element. When creating the *Virtual Array* meta element, another *Array* meta element has to be selected. |

Administrative Functions

All Meta element operations are effective by selecting a Meta element on the left-hand side, and either Atty Docket No. 0214-0001

- Selecting an operation by clicking on the button tool bar or right clicking on the Meta element and choosing the operation from the context sensitive menu, or
- Modifying Meta element attributes and properties on the right-hand side of the screen.

Possible operations are:

- Saving the Meta Model (using the context sensitive menu 'Save' or toolbar icon ).

All Meta data is saved, and all data is marked as 'not modified' again.
- Importing the Meta Model from an XML file (using the context sensitive menu 'Import' or toolbar icon ). Refer to the 'XML Operations' section.
- Exporting the Meta Model to an XML file (using the context sensitive menu 'Export' or toolbar icon ). Refer to the 'XML Operations' section.
- Adding a Meta data sibling (using the context sensitive menu 'Add Meta Data Sibling' or toolbar icon ). In other words, a new Meta element is added at the same level of the Meta element currently selected. The parent Meta data is flagged as modified, and the user must save the Meta data before the Meta data model change is effective.
- Adding a Meta data Child (using the context sensitive menu 'Add Meta Data Child' or toolbar icon ). In other words, a new Meta element is added as a child of the currently selected Meta element. The parent Meta data is flagged as modified, and the user must save the Meta data before the Meta data model change is effective.
- Deleting the currently selected Meta element (using the context sensitive menu 'Delete Meta Data' or toolbar icon ). The parent Meta data is flagged as modified, and the user must save the Meta data before the Meta data model change is effective.
- Expanding the currently selected Meta element (using the context sensitive menu 'Expand All' or toolbar icon ). In other words, all Meta children of the currently selected Meta element are displayed.

Atty Docket No. 0214-0001

- Collapsing the currently selected Meta element (using the context sensitive menu 'Expand All' or toolbar icon ). In other words, all Meta children of the currently selected Meta element are not displayed.
- Cutting the current Meta element and all child Meta elements to the clipboard (using the context sensitive menu 'Cut' or toolbar icon ).
- Copying the current Meta element and all child Meta elements to the clipboard (using the context sensitive menu 'Copy' or toolbar icon .) The parent Meta data is flagged as modified, and the user must save the Meta data before the Meta data model change is effective.
- Pasting Meta elements from the clipboard to the currently selected Meta element (using the context sensitive menu 'Paste' or toolbar icon .) The parent Meta data is flagged as modified, and the user must save the Meta data before the Meta data model change is effective.

Additional operations are:

- Refreshing the Meta data model display by using the context sensitive menu 'Refresh' or toolbar icon .
- Searching for a string in the Meta data by using the toolbar icon .
- Finding the next item in the Meta data for the search that was previously performed by using the toolbar icon .

Closing the application when data has been modified will prompt the user to save the changes and close the application, ignore the changes and close the application, or cancel closing the application.

XML Operations

Importing Meta Data

Meta data can be created by importing a Meta data XML export file.

Atty Docket No. 0214-0001

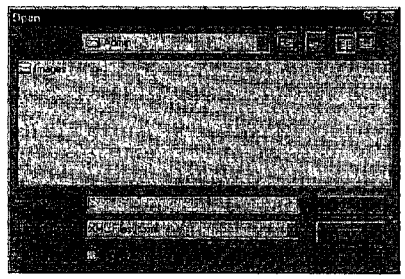

To start this operation, use the context sensitive menu 'Import' or click on the  toolbar icon. Two options are available:

- *Insert at selected Meta data.*

The Meta data input is read, and the new Meta data elements are inserted at the current location as children of the currently selected Meta element. This operation may fail if any imported Meta element name is identical to any of the existing Meta element name elsewhere in the model.

- *Create an entirely new Meta data branch.*

The Meta data input is read and an entirely new Meta model branch is created. This operation may fail if an imported Meta data name corresponds to an existing Meta data element name present elsewhere in the Meta data model.

The new Meta model will apply to the database only when saved. If the Import operation fails, the Meta model is not affected by any of the Import operation.

Exporting Meta Data

The Meta data model can be exported as an XML file by using the context sensitive menu 'Export' or the toolbar icon .

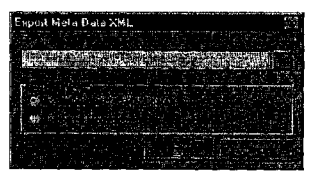

Two options are available:

- *Export at selected Meta data.*

The current Meta data branch is exported as an XML file.

75

Atty Docket No. 0214-0001

- *Export all Meta data.*

All Meta data elements are exported into a single XML output file.

Meta View Management

Introduction

Meta Views allow for Meta data elements to be gathered into a single structure called a Meta View. Whenever Instance data is inserted, corresponding to any the Meta data definitions, then the Meta View is updated to reflect the instance Data State. In other words, Meta Views are one-level collections of Meta data elements.

Administration

Meta View administration is granted to the current user if the user has privileges on the 'All' Meta View Class of objects.

Figure 15:
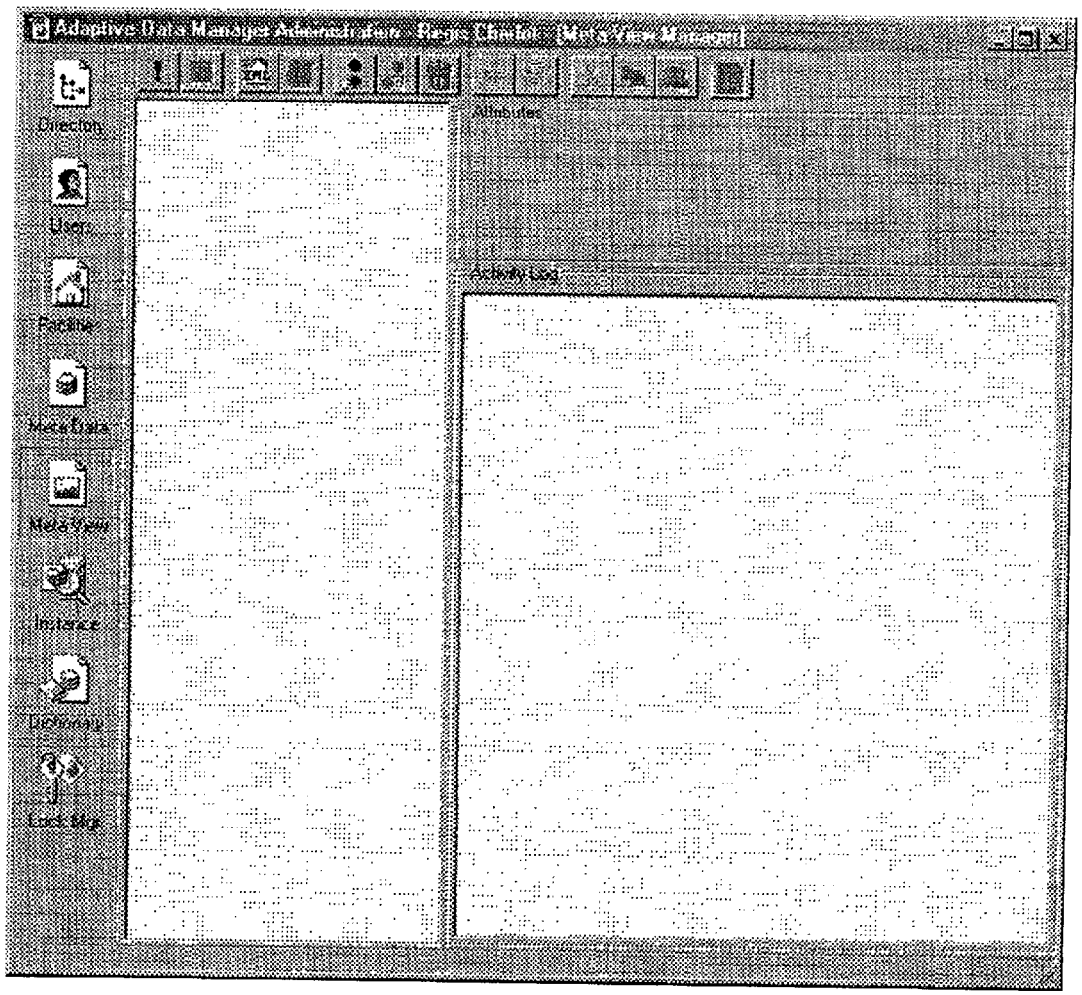
FIG. 15 is a screen of the ADM Adminstration Utility Meta View Manager.

Turning to FIG. 15, the Meta View Manager screen is shown.

Expanding a Meta View on the left-hand side, by either clicking on the [+] icon or double-clicking on the Meta View name, will show all Meta Data elements that are part of the Meta View.

Selecting a Meta View name on the left-hand side allows the Meta View name to be modifiable on the right-hand side. Selecting a Meta View element on the left-hand side allows the Meta View element name to be renamed, and possibly a different Meta element to be selected. Any element of the Meta view can be removed. A new Meta View element can be added at any time.

Modifying Meta View attributes does not modify the database right away. Changes are only submitted to the database when 'saving' the Meta View data to the database. Note that the Meta View data model can be refreshed (i.e. re-read) from the database if the Meta View data is in a modified state. The user is then prompted to save or ignore changes, prior to refreshing the Meta View data display. Only Meta View elements that have been changed are saved to the database.

All Meta View element operations are effective by selecting a Meta View element on the left-hand side, and either Atty Docket No. 0214-0001

- Selecting an operation by clicking on the button tool bar or right clicking on the Meta View element and choosing the operation from the context sensitive menu, or

- Modifying Meta View element attributes and properties on the right-hand side of the screen.

Possible operations are:

- Refreshing the Meta View Model (using the context sensitive menu 'Refresh' or toolbar icon ).
- Saving the Meta View Model (using the context sensitive menu 'Save' or toolbar icon ).

All Meta View data is saved, and all data is marked as 'not modified' again.

- Importing the Meta View Model from an XML file (using the context sensitive menu 'Import' or toolbar icon ). Refer to the 'XML Operations' section.
- Exporting the Meta View Model to an XML file (using the context sensitive menu 'Export' or toolbar icon ). Refer to the 'XML Operations' section.
- Adding a new Meta View (using the context sensitive menu 'Add View' or toolbar icon ). The element is flagged as modified, and the user must save the Meta View before the Meta View model change is effective.

Note that the Meta View name cannot be any of these reserved keywords:

AUTHENTICATION, AUTHENTICATION_ARC, AUTHENTICATION_SEQ,

DATA_IN_PROCESS, DATA_PROCESSOR, DATA_PROCESSOR_SEQ,

DICTIONARY_GROUP, DICTIONARY_GROUP_ARC, DICTIONARY_ITEM,

DICTIONARY_ITEM_ARC, DIRECTORY, DIRECTORY_ARC,

DIRECTORY_SEQ, FACILITY, FACILITY_ARC, FACILITY_SEQ,

META_APPLICATION, META_APPLICATION_ARC,

META_APPLICATION_SEQ, META_NODE, META_NODE_ARC,

META_NODE_EDGE, META_NODE_SEQ, META_VIEW,

META_VIEW_COLUMN, META_VIEW_LOG, META_VIEW_SEQ, NODE,

77

NODE_ARC, NODE_EDGE, NODE_LOCK, NODE_SEQ,
NODE_WORD_INDEX, SEQUENCE_GENERATOR, SYSTEM_USER,
SYSTEM_USER_ARC, SYSTEM_USER_EVENT,
SYSTEM_USER_EVENT_SEQ, SYSTEM_USER_GROUP,
SYSTEM_USER_SEQ

- Adding a new Meta View Column (using the context sensitive menu 'Add View Column' or toolbar icon ). In other words, a new Meta View column is added as a child of the currently selected Meta View element. The Meta View element is flagged as modified, and the user must save the Meta View elements before the Meta View model change is effective.
- Deleting a Meta View or Column (using the context sensitive menu 'Delete View' or toolbar icon ). The Meta View element is flagged as modified, and the user must save the Meta View elements before the Meta View model change is effective.
- Expanding the current Meta View elements (using the toolbar icon ).
- Collapsing the current Meta View elements (using the toolbar icon ).
- Cutting the current Meta View element to the clipboard (using the context sensitive menu 'Cut' or toolbar icon ).
- Copying the current Meta View element to the clipboard (using the context sensitive menu 'Copy' or toolbar icon ). The user must save the Meta View elements before the changes are effective.
- Pasting Meta View elements from the clipboard (using the context sensitive menu 'Paste' or toolbar icon ). The user must save the Meta Views before the Meta View model change is effective.
- Displaying the corresponding Meta Element from a Meta View column element (using the context sensitive menu 'Meta Element' or toolbar icon ).

Closing the application when data has been modified will prompt the user to save the changes and close the application, ignore the changes and close the application, or cancel closing the application.

Atty Docket No. 0214-0001

Interactions with the View Services

The basic purpose of the Meta View section is to prepare and manage Meta view data for the multiple view services. The log of activity is visible on the right hand side of the Meta view form in the Activity Log panel, by selecting a Meta View name on the left hand side panel. Right clicking on the left or right hand side panels allows several operations to interact with the background views services:

- Refresh Log (Left hand-side panel) or Refresh (Activity Log panel): This command allows the activity log content to be refreshed. Note that this content is also refreshed with selecting a different Meta view.
- Clear (Activity Log panel only): This command allows clearing the activity log for a specific Meta view.
- Force Creation (Left hand-side panel and Activity Log panel): This command forces the view services to recreate a view from the Meta view definition. This command is especially useful when a view creation previously failed due to the presence of a non-numeric character inside a numeric field such as a date, integer or floating-point field for example. Further refreshing the log will display real-time activity of the view service recomposing the view.

XML Operations

Importing Meta View Data

Meta Views can be created by importing a Meta View export XML file. To start this operation, use the context sensitive menu 'Import' or click on the  toolbar icon. A Meta View export file may have one or many Meta View definitions. The new Meta views will only apply to the database when saved. If the Import operation fails, then the Meta model is not affected by any of the Import operation.

Exporting Meta View Data

The Meta views can be exported as an XML file by using the context sensitive menu 'Export' or the toolbar icon .

Atty Docket No. 0214-0001

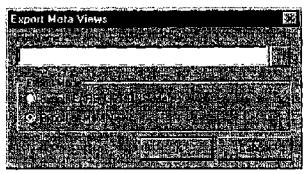

Two options are available:

- *Export selected Meta View.*

The current Meta view is exported as an XML file.

- *Export all Meta Views.*

All Meta Views are exported into a single XML output file.

Instance Data Management

Figure 16:
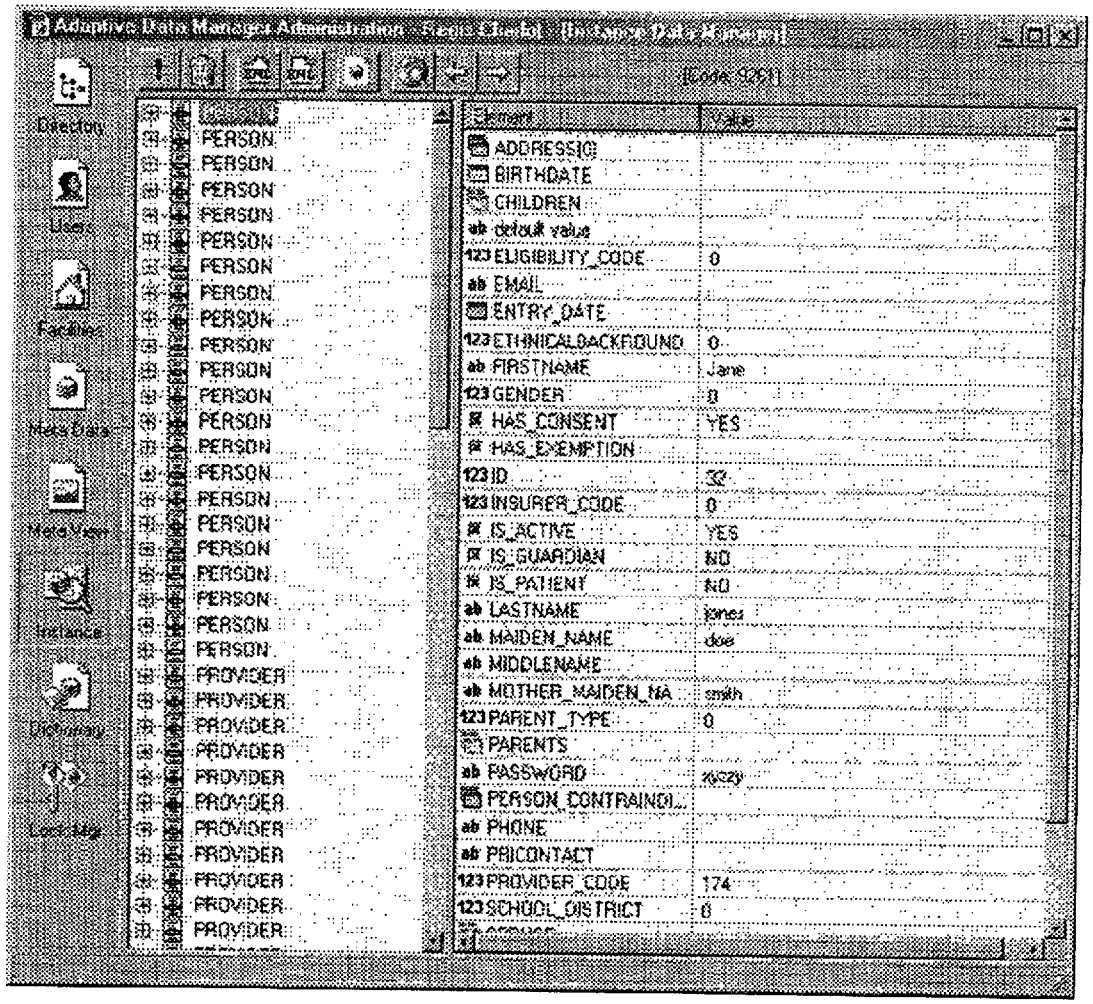
FIG. 16 is a screen of the ADM Adminstration Utility Instance Data Manager.

Turning to FIG. 16, the Instance Data Manager screen is shown.

Instance data consists of application user data shaped after the corresponding Meta data. In other words, instance data is the instantiation of the Meta data. For more information about Meta Data and Instance data, refer to the *ADM COM User Manual* document, '*Data Store Model*' Section.

Instance Data administration is granted to the current user if the user has privileges on the 'All' Meta Data Class of objects.

Administration

The Instance data management tool has been built to emulate features from Microsoft Explorer. The desktop view presents two panes, the left one exclusively for navigation, and the right one for navigation and displaying instance data values. The left-hand side tree view style object only presents instance data of data type *Container*, *Array* or *Virtual Array*, thus enabling the display of the data tree. The right-hand side list view object presents three types of information:

- Instance data discrete values: These instance data elements are the children of the instance data element selected on the left-hand side. These elements' data types are *string, integer, Boolean, date,* and *real* data types. Double-clicking on the instance data, or using the context sensitive menu 'Open' can modify this value.

Atty Docket No. 0214-0001

- Instance data array data values: These instance data elements are also the children of the instance data element selected on the left-hand side, but allow for further navigation into the instance data tree. Double-clicking on the instance data entry, or using the context sensitive menu 'Open' can expand this value.
- The *default value*, as the instance data value the instance data element selected on the left-hand side. This value can be modified by either double-clicking on the list view '*default value*' value, or by using the context sensitive menu 'Open'.

Several operations are possible on all instance data elements by selecting an instance data element, and selecting an operation by clicking on the button tool bar or by right clicking on the instance data element and choosing the operation from the context sensitive menu. Possible operations are:

- Refreshing the current instance data display by either using the context sensitive menu 'Refresh' or toolbar icon .
- Deleting the currently selected instance data element (either using the context sensitive menu 'Delete' or toolbar icon ). AFTER ANSWERING "Yes" TO "Delete Node 'x' and child nodes?", ALL CORRESPONDING INSTANCE DATA IS IMMEDIATELY DELETED. THERE IS NO POSSIBLE UNDO OPERATION.
- Import instance data from an XML file (either using the context sensitive menu 'Import' or toolbar icon ). Refer to the 'XML Operations' section.
- Export Instance data to an XML file (either using the context sensitive menu 'Export' or toolbar icon ). Refer to the 'XML Operations' section.
- Navigate to the instance data's Meta data.

This feature provides the ability to navigate to the Meta data in the Meta Data form, either using the context sensitive menu 'View Meta Data' or toolbar icon .

- Search for Instance data.

This feature provides the ability to search instance data that has been flagged

Atty Docket No. 0214-0001 for the Index interface search engine. Refer to the 'Searching the instance data' section.

Searching the Instance Data

Some Meta data elements may be flagged as 'indexed'. For example, in the case of a newspaper article having an author, a headline, a date, a story and a title, all authors, title and story will be flagged as '*Free Text Index*', while the article (meta data parent of previously mentioned meta data elements) will be the '*Index result*'. If the result of a search query presents itself of a hit on an article title, then the article itself (i.e. the '*Index result*') is the result of the query, and will be returned as such to the user.

Searches can be done either on a portion of the instance data, or on the whole instance data. Clicking on the  icon, will bring about the following window:

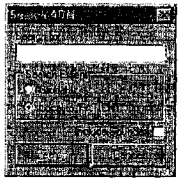

This window allows one to either search starting at the previously selected instance data object, or to perform a global search. The search can include many words: the search will be equivalent to 'Word#1 AND Word#2 AND Word#3...' Note that the search may also be broadened to a Soundex search.

After pressing 'Search', and if the search is unsuccessful, a message is presented to the user announcing that 'No instance data was found having "x" '. If at least one instance data is found, the window is dismissed and this instance data is opened and presented as selected to the user.

The top of the instance data tool also presents the number of query results, as well as left and right arrows for navigating from one query result to the next query result.

Atty Docket No. 0214-0001

XML Operations

Importing Instance Data

Instance data can be imported from an export XML file. To start this operation, use the context sensitive menu 'Import' or click on the  toolbar icon.

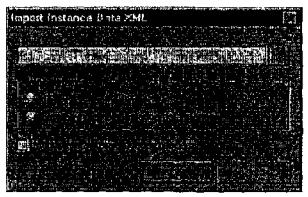

This dialog box requires an existing XML file to be selected. It also requires specifying if the imported instance data should be created as a new instance data tree, merged or appended to the currently selected instance data. Note that the instance data may contain instantiation of Meta elements not present into the current Meta model. The 'Modify Meta Data Model as needed' check box allows for such extension.

Exporting Instance Data

Instance data can be exported to an XML file. To start this operation, use the context sensitive menu 'Export' or click on the  toolbar icon. Instance data is exported, beginning where the user had currently selected instance data.

Dictionary Management

Introduction

The Dictionary concept is a remnant from relational database structures. Most data inserted into relational database is coded and only the description is shown to the user. If a codified element description is changed, the element codification is not affected and any table relationships are still valid.

The same concept applies for Meta Data-based structures. While the emphasis is not necessarily on table relationships, the ability to code a fixed data set and to only store the coded value is important. The Meta data structure puts an emphasis on the end-user application for displaying dictionary lists, and providing back to ADM codified values.

Atty Docket No. 0214-0001

Dictionary entries are identified with dictionary type, ID and description. The dictionary type identifies the dictionary group. A group is a collection of dictionary items of the same type. Items are ordered with a position, thus allowing the display to be changed for user convenience.

5  Administration

The Dictionary administration tool is the seventh icon button of the ADM administration tool. The tool will show on the left-hand side all dictionary groups that have been already defined. Note that ADM defines by default one dictionary group, 'USER_GROUP', for management of the Meta data.

Figure 17:
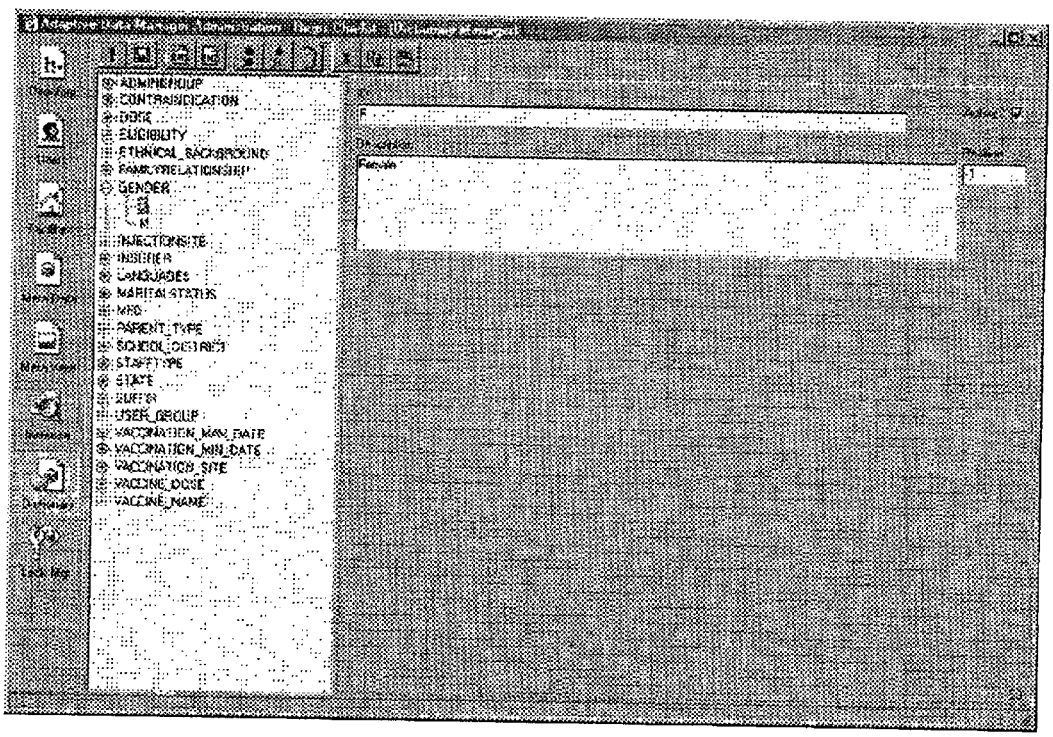
FIG. 17 is a screen of the ADM Adminstration Utility Dictionary Manager.

10  Turning to FIG. 17, the Dictionary Manager screen is shown.

Expanding a dictionary group on the left-hand side, by clicking on the [+] icon or double-clicking on the dictionary groups title, will show all dictionary items that are part of the dictionary group.

Selecting a dictionary group or dictionary item on the left-hand side allows the 15  element to be modifiable on the right-hand side. Selecting a dictionary group element will display the element ID, administration level, numeric-only flag, active flag and description. Selecting a dictionary item element will display the element ID, administration level, numeric-only flag, active flag and description as well, with a larger description field available.

20  Modifying dictionary attributes does not modify the database immediately. Changes are only submitted to the database when 'saving' the dictionary data to the database. Note that the dictionary data can be refreshed (i.e. re-read) from the database. If the dictionary data was in a modified state, then the user is prompted to save or ignore changes, prior to refreshing the dictionary data display. Only 25  dictionary elements that have been changed are saved to the database.

All dictionary element operations are effective by selecting a dictionary element on the left-hand side, and either

- Selecting an operation by clicking on the button tool bar or by right clicking on the dictionary element and choosing the operation from the context 30  sensitive menu, or Atty Docket No. 0214-0001

- Modifying dictionary element attributes and properties on the right-hand side of the screen.

Possible operations are:

- Saving the dictionary data (using the context sensitive menu 'Save' or toolbar icon ). All dictionary data is saved, and all data is marked as 'not modified' again.
- Importing dictionary data from an XML file (using the context sensitive menu 'Import' or toolbar icon ). Refer to the 'XML Operations' section.
- Exporting the dictionary data to an XML file (using the context sensitive menu 'Export' or toolbar icon ). Refer to the 'XML Operations' section.
- Auto-ordering dictionary items for the current dictionary group (using the context sensitive menu 'Auto Order' or toolbar icon ).
- Adding a new dictionary group (using the context sensitive menu 'Add Group' or toolbar icon ). The user must save the dictionary elements before the changes are effective.
- Adding a new dictionary item (using the context sensitive menu 'Add Item' or toolbar icon ). The user must save the dictionary elements before the changes are effective.
- Deleting a dictionary element (using the context sensitive menu 'Delete Item' or toolbar icon ). The user must save the dictionary elements before the changes are effective.
- Cutting to the clipboard the current dictionary element (using the context sensitive menu 'Cut' or toolbar icon ). The user must save the dictionary elements before the changes are effective.
- Copying to the clipboard the current dictionary element (using the context sensitive menu 'Copy' or toolbar icon ). The user must save the dictionary elements before the changes are effective.
- Pasting from the clipboard dictionary elements (using the context sensitive menu 'Paste' or toolbar icon ). The user must save the dictionary elements before the changes are effective.

Atty Docket No. 0214-0001

Additional operations are:

- Refreshing the dictionary display by using the context sensitive menu 'Refresh' or toolbar icon .

Closing the application when data has been modified will prompt the user to save the changes and close the application, ignore the changes and close the application, or cancel closing the application.

XML Operations

Importing Dictionary Data

Dictionaries can be created by importing a dictionary export XML file. To start this operation, use the context sensitive menu 'Import' or click on the  toolbar icon. A dictionary export file may have one or many dictionary group definitions. The new dictionary will only apply to the database when saved. If the Import operation fails, the dictionary model is not affected by any of the Import operation.

Exporting Dictionary Data

The dictionary data can be exported as an XML file by using the context sensitive menu 'Export' or using the toolbar icon .

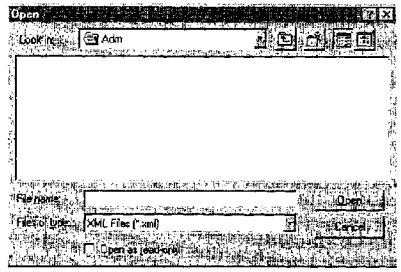

Two options are available:

Atty Docket No. 0214-0001

- *Export selected Dictionary Group.*

The current dictionary is exported as an XML file.

- *Export all Dictionary Groups.*

All dictionary groups are exported into a single XML output file.

Instance Data Lock Management

Introduction

An instance data lock is the means to grant exclusive (Read & Write) data access to one user while any other users have read-only access to the same data. Locks are structures requested by end-user applications. By default, all data is accessed in read-only mode. Setting a lock on a particular instance data node will grant exclusive access to this instance data node AS WELL AS ALL CHILD INSTANCE DATA NODE OF THAT NODE. Therefore, one needs only one lock to grant access to many instance data elements. This ability must be weighted against being able to grant many users concurrent instance data elements. Most of the possibility of concurrent data access lies on a correctly object oriented design, expressed in terms of Meta data design.

Locks consist of an instance data reference, a date when the lock was set, a lock owner, a session number, and the machine that placed the lock. The session guarantees that the same user (owner) may place several locks under different application sessions without conflicts.

Access to this section is granted to user having privileges on Meta Data management.

Administration

Figure 18:
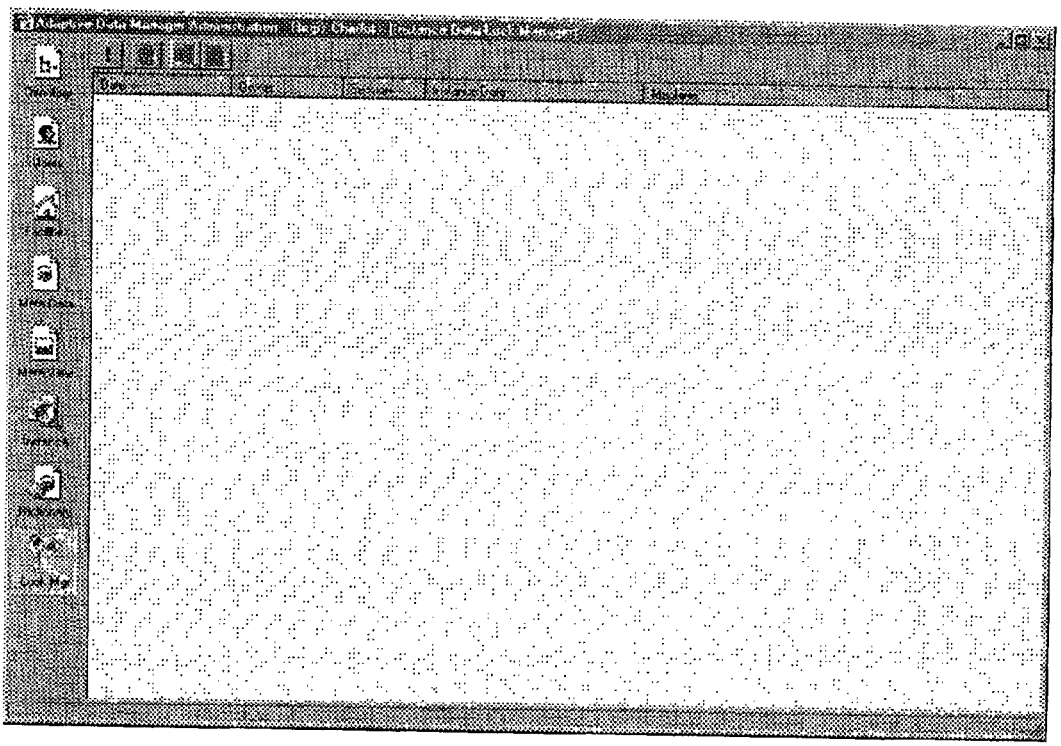
FIG. 18 is a screen of the ADM Adminstration Utility Instance Data Lock Manager.

Turning to FIG. 18, the Instance Data Lock Manager screen is shown.

By selecting a specific lock entry, the tool provides four basic features:

- Refresh the list of locks.

Using the context sensitive menu 'Refresh' or toolbar icon  can refresh (i.e. re-load) the list of current locks.

- Delete a lock.

Using the context sensitive menu 'Delete Group', or toolbar icon can delete the selected lock . Note that this action can seriously hinder any currently Atty Docket No. 0214-0001 active application making reference to the corresponding instance data. This tool feature should be used with care and consideration.

- Navigate to the lock instance data.
5   This feature provides the ability to navigate to the instance data in the Instance Data form, using the context sensitive menu 'View Instance Data' or toolbar icon .

- Navigate to the lock Meta data.
   This feature provides the ability to navigate to the Meta data in the Meta Data form, using the context sensitive menu 'View Meta Data' or toolbar icon .

10   The present invention should not be limited to the above-described embodiments, but should be limited solely by the following claims.

What is claimed is:

1. A method for managing a back-end information storage infrastructure and a flexible development environment for data storage using a computer system, comprising:

managing system resources including a relational database;

authenticating and selectively providing access to users through a directory describing predetermined user rights;

modeling processes to create a meta data model that encloses definitions of meta data elements and relationships among the elements using trees and graphs;

running the processes and generating instance data;

storing the instance data following the meta data model while providing management of multi-user access and concurrency; and transforming the instance data into physical views.

2. A method in accordance with claim 1, further comprising optimizing the meta data model by optimally structuring the trees and graphs in the relational database.

3. A method in accordance with claim 1, wherein the relationships among the data elements are characteristic of the relationships between living organisms.

4. A method in accordance with claim 1, further comprising expanding the meta data model, as meta data expands, without effect on current applications.

5. A method in accordance with claim 2, wherein a plurality of concurrent meta data model trees with corresponding separate instance data trees are used in the same database.

6. A method in accordance with claim 1, further comprising auditing and tracking database changes with user and date information.

7. A method in accordance with claim 1, further comprising providing for import and export of both meta data model and instance data using extensible mark-up language.

8. A method in accordance with claim 1, wherein the database is an Oracle database and the transforming of instance data into a view comprises:

defining of the view by the user;

processing the view using traditional relational Oracle tables; and allowing access of the view with any SQL enabled tool.

* * * * *